United States Patent
Okubo et al.

(10) Patent No.: US 6,807,366 B1
(45) Date of Patent: Oct. 19, 2004

(54) DATA RECORDING APPARATUS, DATA RECORDING/REPRODUCING APPARATUS, DATA RECORDING METHOD, AND DATA RECORDING/REPRODUCING METHOD

(75) Inventors: Atsushi Okubo, Kanagawa (JP); Takao Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/570,458

(22) Filed: May 12, 2000

(30) Foreign Application Priority Data

May 14, 1999 (JP) .......................................... 11-133861

(51) Int. Cl.[7] .............................. H04N 5/91; H04N 7/00; G11B 5/00
(52) U.S. Cl. ........................... 386/124; 386/68; 386/46; 360/32
(58) Field of Search ........................... 386/68, 46, 109, 386/67, 69, 111, 27, 6, 32, 124; 360/32

(56) References Cited

U.S. PATENT DOCUMENTS

| | | | | | |
|---|---|---|---|---|---|
| 5,602,943 | A | * | 2/1997 | Velho et al. | 382/266 |
| 5,729,649 | A | * | 3/1998 | Lane et al. | 386/68 |
| RE37,810 | E | * | 7/2002 | Oikawa | 386/74 |
| 6,473,809 | B1 | * | 10/2002 | Aref et al. | 710/6 |
| 6,571,015 | B1 | * | 5/2003 | Matsuo et al. | 382/232 |

FOREIGN PATENT DOCUMENTS

| | | |
|---|---|---|
| EP | 0 562 845 | 9/1993 |
| WO | WO 94 17631 | 8/1994 |

* cited by examiner

Primary Examiner—Chris Kelley
Assistant Examiner—Jamie Vent
(74) Attorney, Agent, or Firm—Frommer Lawrence & Haug LLP; William S. Frommer; Dennis M. Smid

(57) ABSTRACT

The invention relates to a data recording apparatus in which a shuffling process for enabling a reproduced image to be easily seen in a high speed reproducing mode of a digital VTR is performed to data to be recorded. As a recording unit to perform the shuffling process, (16×16) macroblocks are set. A process for forming line segments to draw cross lines adapted to divide the recording unit into four equal parts and deleting line segments among four macroblocks around a cross point of the cross lines is repetitively performed until a curve obtained by tracing edges of the formed line segments passes through all of the macroblocks. Further, the line segments are concealed at a position where the curve passes through the same macroblock twice, thereby allowing the curve to pass through the same macroblock once. The order of the recording positions of sync blocks on a tape is specified by the order of drawing the curve P2. Upon reproduction, the recording positions of the reproduced sync blocks are converted into the image positions of the macroblocks.

11 Claims, 20 Drawing Sheets

(1/4)

(1/16)

P1

(1/64)

P2

OVERLAP OF CURVES ON THE SAME
MACROBLOCK IS CORRECTED

Fig. 5A

|   |   |   | 9MB |   |   |   |   |   |
|---|---|---|---|---|---|---|---|---|
| 1 | 2 | 3 | 4 | 5 | 6 | 7 | 8 | 9 |
| 10 | 11 | 12 | 13 | 14 | 15 | 16 | 17 | 18 |
| 19 | 20 | 21 | 22 | 23 | 24 | 25 | 26 | 27 |
| 28 | 29 | 30 | 31 | 32 | 33 | 34 | 35 | 36 |
| 37 | 38 | 39 | 40 | 41 | 42 | 43 | 44 | 45 |
| 46 | 47 | 48 | 49 | 50 | 51 | 52 | 53 | 54 |
| 55 | 56 | 57 | 58 | 59 | 60 | 61 | 62 | 63 |
| 64 | 65 | 66 | 67 | 68 | 69 | 70 | 71 | 72 |

8MB (vertical)

MACROBLOCK NO.

Fig. 5B

|   |   |   | 9MB |   |   |   |   |   |
|---|---|---|---|---|---|---|---|---|
| 1 | 2 | 3 | 13 | 14 | 15 | 25 | 26 | 27 |
| 4 | 5 | 6 | 16 | 17 | 18 | 28 | 29 | 30 |
| 7 | 8 | 9 | 19 | 20 | 21 | 31 | 32 | 33 |
| 10 | 11 | 12 | 22 | 23 | 24 | 34 | 35 | 36 |
| 37 | 38 | 39 | 49 | 50 | 51 | 61 | 62 | 63 |
| 40 | 41 | 42 | 52 | 53 | 54 | 64 | 65 | 66 |
| 43 | 44 | 45 | 55 | 56 | 57 | 67 | 68 | 69 |
| 46 | 47 | 48 | 58 | 59 | 60 | 70 | 71 | 72 |

8MB (vertical)

SYNC BLOCK NO.

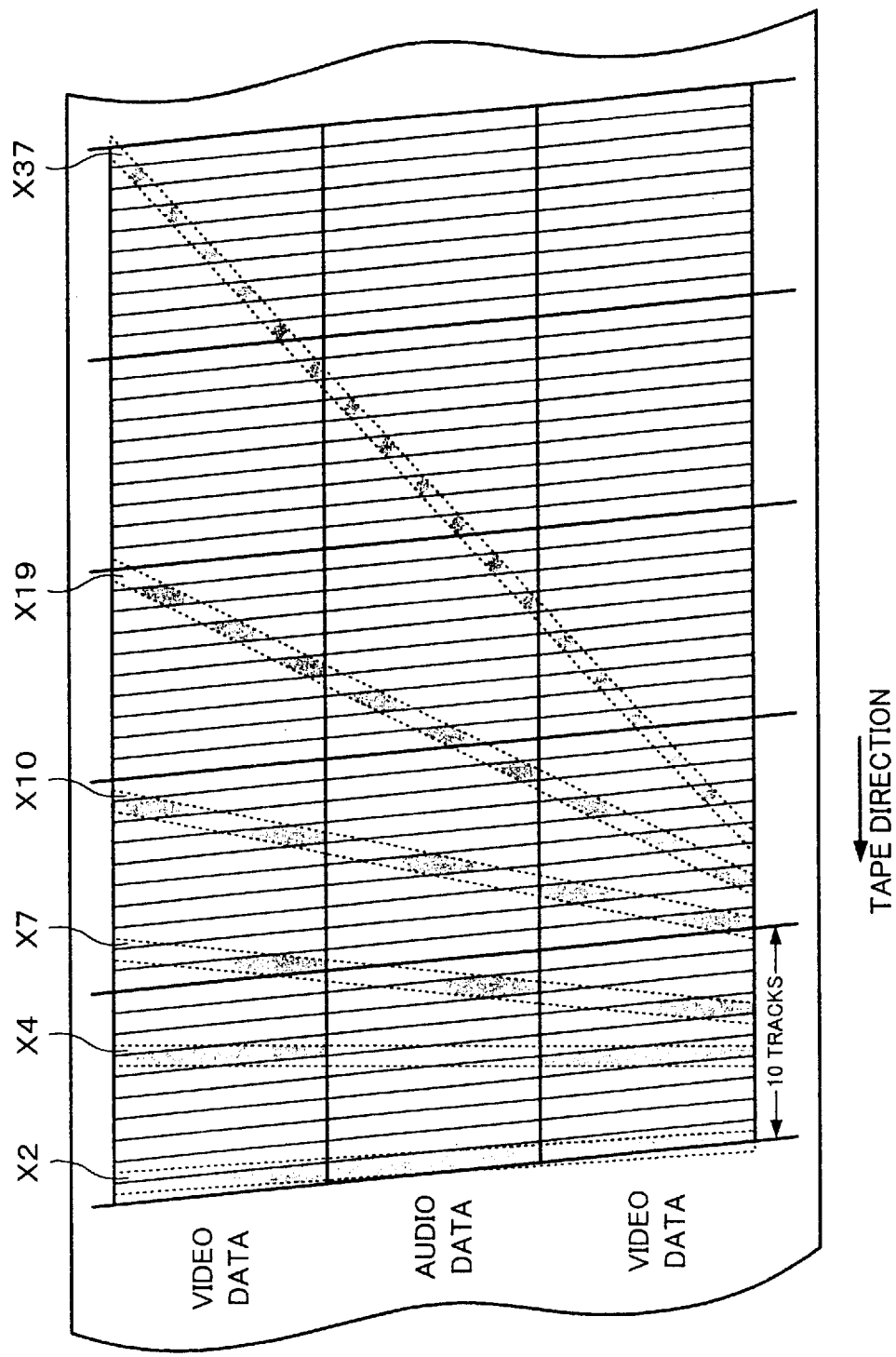

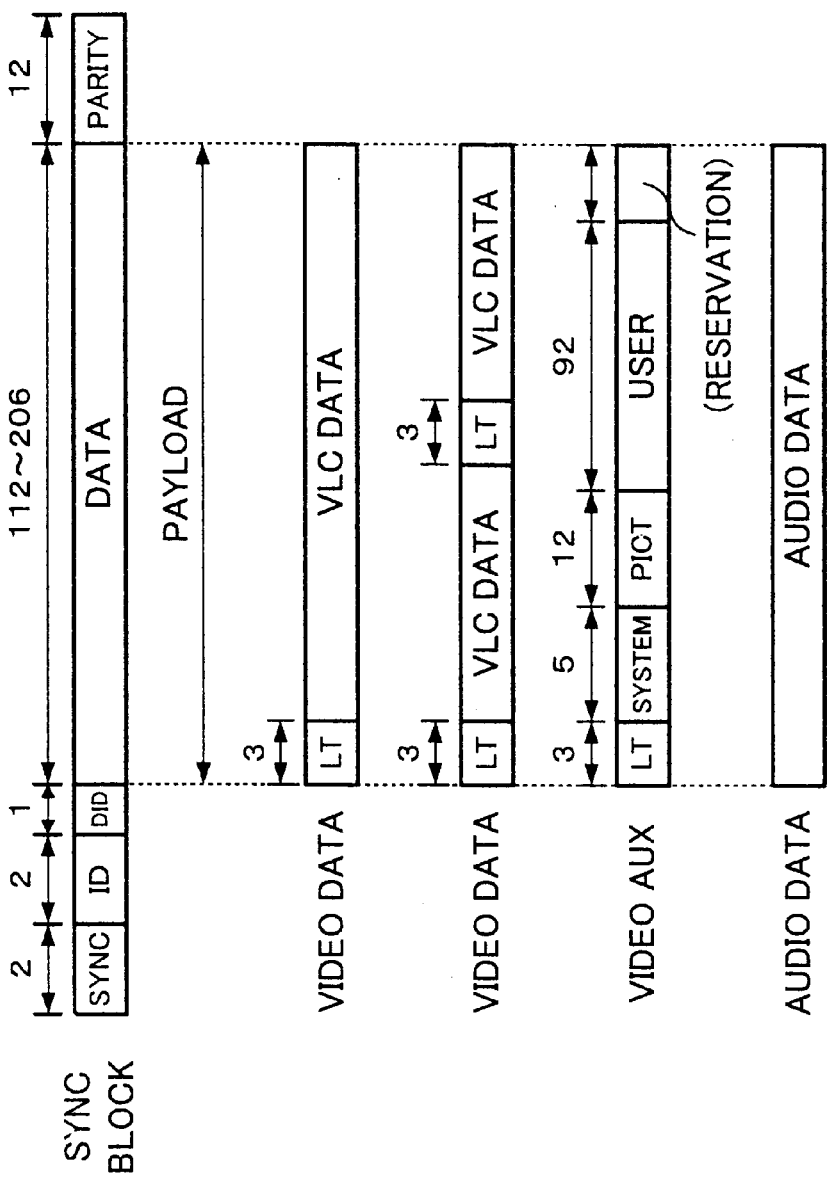

Fig. 13A  Fig. 13B  Fig. 13C

| MSB | ID0 | ID1 | DID(VIDEO) | DID(AUDIO) |
|---|---|---|---|---|
| 7 | SYNC ID7 | Upper/Lower | (Reserrvel) | (Reserrvel) |
| 6 | SYNC ID6 | (Reserrvel) | (Reserrvel) | (Reserrvel) |
| 5 | SYNC ID5 | SEG NB3 | (Reserrvel) | (Reserrvel) |
| 4 | SYNC ID4 | SEG NB2 | (Reserrvel) | (Reserrvel) |
| 3 | SYNC ID3 | SEG NB1 | PAYLOAD MD1 | DATA/AUDIO |
| 2 | SYNC ID2 | SEG NB0 | PAYLOAD MD0 | 5F Seg2 |
| 1 | SYNC ID1 | TRACK | 2MB/IMB | 5F Seg1 |
| 0 | SYNC ID0 | VIDEO/AUDIO | Vouter | 5F Seg0 |

LSB

DATA RECORDING APPARATUS, DATA RECORDING/REPRODUCING APPARATUS, DATA RECORDING METHOD, AND DATA RECORDING/REPRODUCING METHOD

BACKGROUND OF THE INVENTION

1. Field of the Invention

The invention relates to a data recording apparatus, a data recording/reproducing apparatus, a data recording method, and a data recording/reproducing method which are applied to, for example, a case of recording image data onto a tape-shaped recording medium and reproducing the image data from the recording medium.

2. Description of the Related Art

A data recording/reproducing apparatus for recording a digital image signal onto a magnetic tape and reproducing a digital image signal from a recording medium is known as represented by a digital VTR (Video Tape Recorder). A shuffling process is performed in a recording processing unit in a digital image recording apparatus. The shuffling process is a process for setting a relation between a position of data on a screen and a recording position on the tape to a desired relation. It is the first object of the shuffling to distribute a burst error upon reproduction, thereby improving a correction ratio of the error correction by an error correction code such as a product code. The second object is to enable uncorrectable errors to be easily concealed. The third object is to enable a reproduction image to be easily seen upon high speed reproduction.

The shuffling process which is used in the conventional digital VTR will now be described. FIG. 1 shows a track pattern on which data of one frame of the digital VTR has been recorded. FIG. 1 shows a helical scan type VTR. Data of one frame is recorded as ten tracks T1 to T10 formed obliquely on the tape. Azimuths of the adjacent tracks are different.

Audio data is recorded in a center portion of each track and video data is recorded on the upper and lower sides of each track. The audio data and video data are subjected to the shuffling process and have been error correction encoded by a product code. The audio data and video data are recorded in a data format called a sync block. The sync block has a data structure in which a sync signal, a sync ID, data (audio data, a parity of an external code of the product code, or video data), and a parity of an internal code of the product code have been arranged in order from the head. For example, data of one macroblock is arranged in one sync block. The audio data and video data shown in FIG. 1 also include the parity of the external code and auxiliary data.

FIG. 2 shows a relation between the video data of one frame and the track on which the video data is recorded. In case of an NTSC television signal of 525 lines/60 fields, valid data of one frame is constructed by 45 macroblocks in the lateral direction and 32 macroblocks in the vertical direction. One macroblock is constructed by (16×16) pixels. The macroblock is a unit of a process in case of compressing the video data by MPEG2 (Moving Picture Experts Group Phase 2). The video data is encoded as variable length data by MPEG2. However, an amount of coded data of one frame is set to be constant by a length equalizing process. In case of compressing data by MPEG2, the coded data corresponding to one macroblock becomes the variable length data. Even in this case, at least significant data in the coded data of one macroblock is arranged into a data area of each sync block.

To record the video data of one frame into each of the upper and lower areas of 10 tracks, the video data of one frame is equally divided into five data in the lateral direction and equally divided into four data in the vertical direction, so that 20 recording units are formed. Each recording unit has a size of (9×8=72 macroblocks). Among the 20 recording units, 10 recording units L1 to L10 of the upper half are video data that is recorded in the lower area of each track and 10 recording units U1 to U10 of the lower half are video data that is recorded in the upper area of each track. L1 and U1 are recording units which are recorded in the lower and upper areas of the track T1, respectively. Numerals which are added to the other recording units also correspond to the numbers of the tracks to be recorded.

As shown in FIG. 3, the shuffling process is performed every recording unit of (9×8) macroblocks. That is, the recording unit is further divided into six subblocks of a size corresponding to (3×4) macroblocks. In each subblock, as shown by an arrow in FIG. 3, three macroblocks arranged in the lateral direction are sequentially selected. When the selection of the macroblocks of one subblock is finished, the top three macroblocks of the second subblock adjacent to such a subblock are selected. When the selection of the macroblocks in the second subblock is finished and, further, the selection of the macroblocks in the third subblock is finished, the process advances to the lower leftmost subblock and the macroblocks in this subblock are selected. In this manner, the macroblocks selected in order shown by arrows in FIG. 3 are sequentially recorded in the area on the tape.

FIG. 4 shows an example of a construction for realizing the shuffling process. The input video data is written into an RAM (Random Access Memory) 161 and the data is read out of the RAM 161. The RAM 161 has a capacity of, for example, one frame and the video data is written into an address corresponding to the position in one frame of each macroblock. A read address in the RAM 161 is generated from a shuffling table 162. Although not shown, a write address in the RAM 161 is generated in accordance with the position of the macroblock on an image. An output of a counter 163 for generating a sync ID is supplied to the shuffling table 162. The position on the image of the macroblock and the recording position of the sync ID are converted into a predetermined relation by the shuffling table 162.

For example, the macro block numbers are specified as shown in FIG. 5A and the sync ID is specified as shown in FIG. 5B. FIGS. 5A and 5B show one recording unit which is recorded on the lower or upper area of one track. The data of each macroblock is recorded in the area on the tape in the scanning direction of the head in order of the numbers of the sync IDs. Although only the sync IDs will be described for simplicity of explanation, in order to record data onto the tape in the format shown in FIG. 1, track IDs to distinguish 10 tracks and an ID to distinguish the upper or lower area of each track are also necessary. The macroblock numbers and the values of the sync IDs are also set to simple numbers starting from 1 for simplicity of explanation. Actually, IDs to distinguish all sync blocks in one track or in the upper area or lower area in one track are used while including a parity of an external code, auxiliary data, and the like.

In case of the digital VTR, besides a normal reproducing operation in which a tape speed upon reproduction is equalized to that upon recording, a high speed reproducing operation in which the tape speed upon reproduction is higher than that upon recording can be performed. In the high speed reproducing mode, as the tape speed rises, a relative speed between the head and the tape changes and a trace locus which is formed when the head passes on the tape is deviated from the track. Thus, although the number of tracks over which the head passes increases, the number of sync blocks which are continuously reproduced from each track decreases and the macroblocks of a plurality of frames mixedly exist on an image and are updated. The position of the macroblock which is updated at each time in the high speed reproducing mode changes depending on a difference of shuffling tables (also called shuffling patterns) in which the position of the macroblock on the image and the recording position on the tape are made to correspond. Since only a part of information recorded on the tape can be obtained in the high speed reproducing mode, in order to enable a reproduction image in the high speed reproducing mode to be easily seen, it is necessary to design the shuffling table so that information can be obtained as much as possible.

FIG. 6 shows a relation between the track pattern in the high speed reproducing mode and the trace locus of the head. FIG. 6 shows the trace locus at each of the 2-times speed (×2), 4-times speed (×4), 7-times speed (×7), 10-times speed (×10), 19-times speed (×19), and 37-times speed (×37) in the forward direction. A forward direction N-times speed mode corresponds to the reproducing operation in which the tape feeding direction is set to be identical to that upon recording and the tape speed is increased by N times. In each trace locus, reproduction data is obtained when the head is located on the track in which the azimuth coincides. When a rotary head traces the tape once, the reproduction data is obtained in a hatched portion in FIG. 6.

In the forward direction high speed reproducing mode, the reproduction data is obtained at the hatched position in one frame in FIGS. 7A to 7E. FIGS. 7A to 7E enlargedly show the obtained reproduction data on a recording unit basis. FIG. 7A shows the video data obtained in the 2-times speed reproducing mode. As will be understood from the trace locus in the 2-times speed reproducing mode shown in FIG. 6, the recording unit L1 in the lower area of the track T1 and the recording unit U1 in the upper area of the track T1 are reproduced by the trace of one time by the head. All data of the recording units L1 and U1 are obtained.

FIG. 7B shows the video data obtained in the 4-times speed reproducing mode. As will be understood from the trace locus in the 4-times speed reproducing mode shown in FIG. 6, the recording unit L1 in the lower area of the track T1 and the recording unit U3 in the upper area of the track T3 are reproduced by the trace of one time by the head. All data of the recording units L1 and U3 are obtained.

FIG. 7C shows the video data obtained in the 7-times speed reproducing mode. As will be understood from the trace locus in the 7-times speed reproducing mode, the data of the half of the recording unit L1 in the lower area of the track T1 and the data of the half of the recording unit U5 in the upper area of the track T5 are obtained by the trace of one time by the head.

Further, FIG. 7D shows the video data obtained in the 19-times speed reproducing mode and FIG. 7E shows the video data obtained in the 37-times speed reproducing mode. In the 19-times speed reproducing mode and the 37-times speed reproducing mode, since the tape speed is fairly high, an amount of data which is obtained in each recording unit decreases. However, the reproduced macroblocks included in the continuous sync IDs are coupled so as to form a rectangle in each recording unit. As mentioned above, in the foregoing conventional shuffling process, in the high speed reproducing mode, the macroblocks of a plurality of sync blocks which are continuously reproduced are coupled so as to form a rectangle on the image.

As another shuffling process, there is such a process that the positions on the screen of the video data obtained from the sync blocks which are continuously reproduced in the high speed reproducing mode are arranged at random. According to this process, the video data which could not be reproduced is interpolated by the video data which could be reproduced. Owing to this method, when a size of video data which is not compressed or a size of macroblock is small, since there is a correlation among the images of the approximate video data or macroblocks, the macroblocks which were not updated can be interpolated by the neighboring updated macroblocks. However, in case of compressing the video data by the size of relatively large macroblock such as a macroblock of (16×16) and recording it, since the interpolation by the adjacent macroblocks is not valid, the shuffling process in which the reproduced macroblocks are coupled so as to form a rectangular area as mentioned above is preferable.

As will be understood from FIG. 3, according to the conventional shuffling process, a plurality of macroblocks are not coupled in a rectangle when the data of a plurality of macroblocks is reproduced so as to exist over boundaries of the subblocks in the recording unit. As mentioned above, according to the conventional shuffling process, the reproduced macroblocks are not coupled so as to form a rectangle in all of the cases. Therefore, such a situation that the macroblocks are not coupled on the image although the sync ID are continuous occurs in dependence on the tape speed in the high speed reproducing mode. This problem is not limited to the tape speed but a similar problem occurs even in the case where a recording format (the number of tracks of one frame, a size of recording unit, or the like) is changed. That is, the shuffling pattern has to be determined in consideration of the recording frame or the tape speed in the high speed reproducing mode. There is such a problem that a high speed reproduction image having high visibility is not derived if the tape is reproduced at an unexpected tape speed or the recording format is different.

OBJECT AND SUMMARY OF THE INVENTION

It is an object of the invention to provide a data recording apparatus, a data recording/reproducing apparatus, a data recording method, and a data recording/reproducing method which can perform such a shuffling process that a plurality of macroblocks which were continuously reproduced in the high speed reproducing mode are coupled in a rectangle without being influenced by a tape speed or a recording format.

According to a preferred aspect of the invention, there is provided a data recording apparatus in which a relation between a position on a display image of image data constructing the display image and a position on a tape-shaped recording medium of the image data in case of recording the image data subjected to a predetermined process onto the tape-shaped recording medium by rotary heads is converted and the image data whose positional relation has been converted is recorded onto the tape-shaped recording medium, comprising:

image block forming means for dividing the image data on a unit basis of a predetermined number and forming a plurality of image blocks;

sync block forming means for forming a sync block as a unit of recording the image blocks onto the tape-shaped recording medium from the image blocks;

shuffling means for performing the conversion from the position on the display image of the image blocks to the position on the tape-shaped recording medium of the sync blocks every recording unit constructed by a predetermined number of the image blocks, performing the conversion in such a manner that in a whole range of the recording unit, the plurality of image blocks included in the plurality of sync blocks which are continuous on the tape-shaped recording medium form an almost rectangle and are coupled, and performing the conversion in such a manner that when curves are drawn in accordance with the order of recording positions of the sync blocks in the recording unit, the curve is drawn so as to pass through all of the image blocks in the recording unit only once; and recording means including a recording rotary head and for recording the sync block whose position has been converted by the shuffling means onto an inclined track of the tape-shaped recording medium.

According to another aspect of the invention, there is provided a data recording/reproducing apparatus in which a relation between a position on a display image of image data constructing the display image and a position on a tape-shaped recording medium of the image data in case of recording the image data subjected to a predetermined process onto the tape-shaped recording medium by rotary heads is converted, the image data whose positional relation has been converted is recorded onto the tape-shaped recording medium, and the image data in which the positional relation has been converted is reproduced from the tape-shaped recording medium, comprising:

image block forming means for dividing the image data on a unit basis of a predetermined number and forming a plurality of image blocks;

sync block forming means for forming a sync block as a unit of recording the image blocks onto the tape-shaped recording medium from the image blocks;

shuffling means for performing the conversion from the position on the display image of the image blocks to the position on the tape-shaped recording medium of the sync blocks every recording unit constructed by a predetermined number of the image blocks, performing the conversion in such a manner that in a whole range of the recording unit, the plurality of image blocks included in the plurality of sync blocks which are continuous on the tape-shaped recording medium form an almost rectangle and are coupled, and performing the conversion in such a manner that when curves are drawn in accordance with the order of recording positions of the sync blocks in the recording unit, the curve is drawn so as to pass through all of the image blocks in the recording unit only once;

recording means including a recording rotary head and for recording the sync block whose position has been converted by the shuffling means onto an inclined track of the tape-shaped recording medium;

reproducing means including a reproducing rotary head and for reproducing the sync block from the tape-shaped recording medium on which the position converted sync block has been recorded;

deshuffling means for performing a conversion opposite to the position conversion which is performed by the shuffling means to the sync block reproduced by the reproducing means, thereby forming the image blocks; and image data forming means for reproducing the image data from the image blocks formed by the deshuffling means.

According to still another aspect of the invention, there is provided a data recording method whereby a relation between a position on a display image of image data constructing the display image and a position on a tape-shaped recording medium of the image data in case of recording the image data subjected to a predetermined process onto the tape-shaped recording medium by rotary heads is converted and the image data whose positional relation has been converted is recorded onto the tape-shaped recording medium, comprising:

an image block forming step of dividing the image data on a unit basis of a predetermined number and forming a plurality of image blocks;

a sync block forming step of forming a sync block as a unit of recording the image blocks onto the tape-shaped recording medium from the image blocks;

a shuffling step of performing the conversion from the position on said display image of the image blocks to the position on the tape-shaped recording medium of the sync blocks every recording unit constructed by a predetermined number of the image blocks, performing the conversion in such a manner that in a whole range of the recording unit, the plurality of image blocks included in the plurality of sync blocks which are continuous on the tape-shaped recording medium form an almost rectangle and are coupled, and performing the conversion in such a manner that when curves are drawn in accordance with the order of recording positions of the sync blocks in the recording unit, the curve is drawn so as to pass through all of the image blocks in the recording unit only once; and a recording step of including a recording rotary head and recording the sync block whose position has been converted in the shuffling step onto an inclined track of the tape-shaped recording medium, according to further another aspect of the invention, there is provided a data recording/reproducing method whereby a relation between a position on a display image of image data constructing the display image and a position on a tape-shaped recording medium of the image data in case of recording the image data subjected to a predetermined process onto the tape-shaped recording medium by rotary heads is converted, the image data whose positional relation has been converted is recorded onto the tape-shaped recording medium, and the image data in which the positional relation has been converted is reproduced from the tape-shaped recording medium, comprising:

an image block forming step of dividing the image data on a unit basis of a predetermined number and forming a plurality of image blocks;

a sync block forming step of forming a sync block as a unit of recording the image blocks onto the tape-shaped recording medium from the image blocks;

a shuffling step of performing the conversion from the position on the display image of the image blocks to the position on the tape-shaped recording medium of the sync blocks every recording unit constructed by a predetermined number of the image blocks, performing the conversion in such a manner that in a whole range of the recording unit, the plurality of image blocks included in the plurality of sync blocks which are continuous on the tape-shaped recording medium form an almost rectangle and are coupled, and performing the conversion in such a manner that when curves are drawn in accordance with the order of recording positions of the sync blocks in the recording unit, the curve is drawn so as to pass through all of the image blocks in the recording unit only once;

a recording step of including a recording rotary head and recording the sync block whose position has been converted in the shuffling step onto an inclined track of the tape-shaped recording medium;

a reproducing step of including a reproducing rotary head and for reproducing the sync block from the tape-shaped recording medium on which the position converted sync block has been recorded;

a deshuffling step of performing a conversion opposite to the position conversion which is performed in the shuffling step to the sync block reproduced in the reproducing step, thereby forming the image blocks; and an image data forming step of reproducing the image data from the image blocks formed in the deshuffling step.

The above and other objects and features of the present invention will become apparent from the following detailed description and the appended claims with reference to the accompanying drawings.

BRIEF DESCRIPTION OF THE DRAWINGS

FIGS. 5A and 5B are schematic diagrams for explaining the conventional shuffling process;

FIG. 6 is a schematic diagram showing several examples of a head trace locus of the high speed reproducing operation used to explain the conventional shuffling process;

FIGS. 12A to 12E are schematic diagrams showing a plurality of examples of a construction of a sync block;

FIGS. 13A to 13C are schematic diagrams showing the contents of IDs which are added to the sync blocks and DIDs;

DETAILED DESCRIPTION OF THE PREFERRED EMBODIMENT

Figure 1:
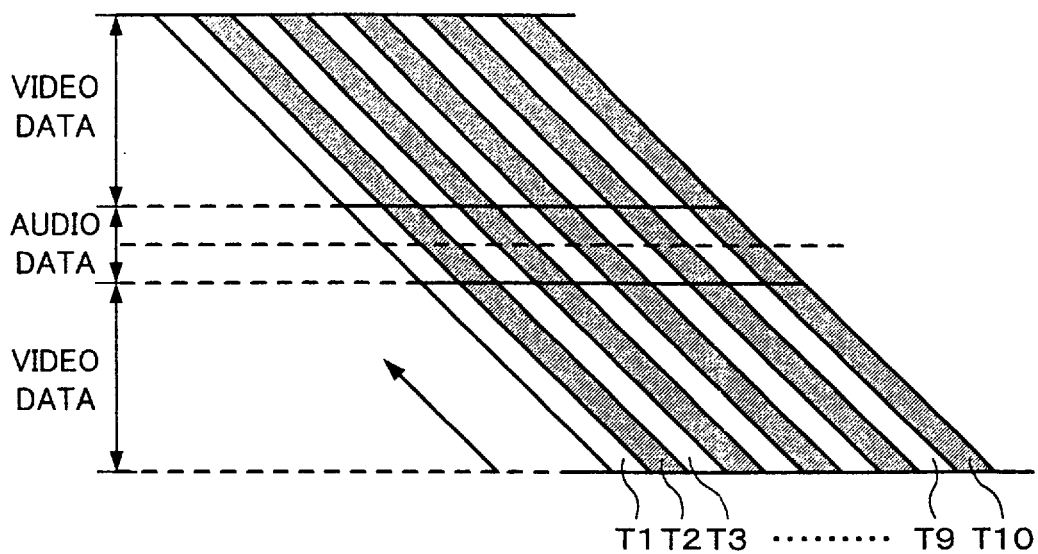
FIG. 1 is a schematic diagram of an example of a track pattern used to explain a conventional shuffling process.
Figure 2:
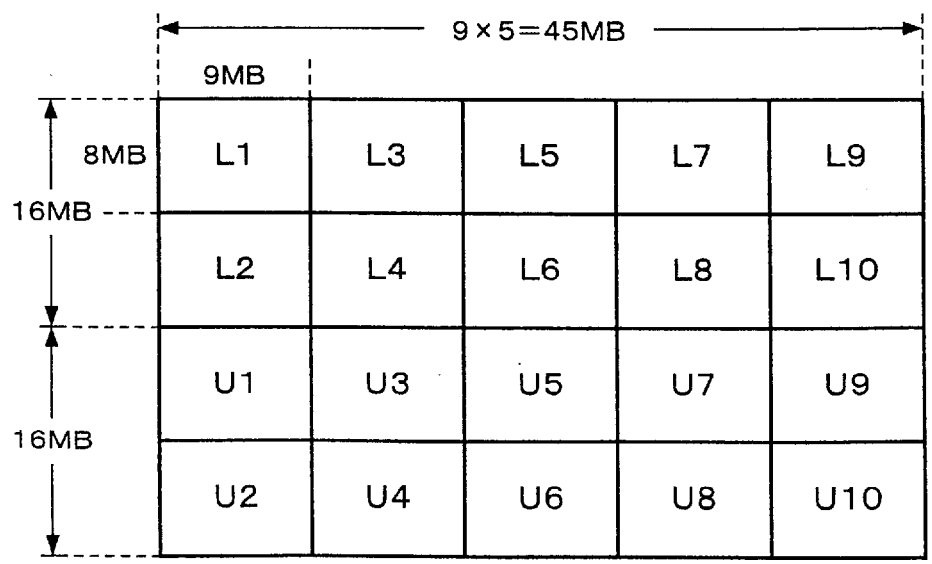
FIG. 2 is a schematic diagram showing a unit of performing the conventional shuffling process.

An embodiment in which the invention is applied to a digital VTR will now be described hereinbelow. The embodiment is suitable for use in an environment of a broadcasting station and enables video signals of a plurality of different formats to be recorded and reproduced. For example, both a signal which is obtained by an interlace scan based on the NTSC system and in which the number of valid lines is equal to 480 (480i signal) and a signal which is obtained by an interlace scan based on the PAL system and in which the number of valid lines is equal to 576 (576i signal) can be recorded and reproduced with hardly changing hardware. Further, a signal which is obtained by an interlace scan and in which the number of lines is equal to 1080 (1080i signal), signals which are obtained by a progressive scan (non-interlace) and in which the numbers of lines are respectively equal to 480, 720, and 1080 (480p signal, 720p signal, 1080p signal), and the like can be also recorded and reproduced.

In the embodiment, the video signal and audio signal are compression encoded on the basis of the MPEG2 (Moving Picture Experts Group Phase 2) system. As is well known, MPEG2 is constructed by combining a motion compensation predictive coding and a compression coding by DCT (Discrete Cosine Transform). A data structure of MPEG2 has a layer structure and there are a block layer, a macroblock layer, a slice layer, a picture layer, a GOP (Group Of Picture) layer, and a sequence layer from the lower order.

The block layer is constructed by a DCT block serving as a unit for performing DCT. The macroblock layer is constructed by a plurality of DCT blocks. The slice layer is constructed by a header portion and an arbitrary number of macroblocks which do not extend over the lines. The picture layer is constructed by a header portion and a plurality of slices. A picture corresponds to one screen (picture plane). The GOP (Group Of Picture) layer is constructed by: a header portion; an I picture as a picture based on an intra-frame coding; and P and B pictures as pictures based on a predictive coding.

According to the I picture (Intra-coded picture), when it is encoded, closed information is used only in one picture. Therefore, upon decoding, the I picture can be decoded only by the information of the I picture itself. According to the P picture (Predictive-coded picture: forward direction predictive coded picture), the I picture or P picture which is preceding with respect to time and has already been decoded is used as a predictive picture (image serving as a reference for obtaining a difference). Either a higher efficient method between a method of encoding a difference between the predictive picture and the motion compensated predictive picture and a method of encoding without obtaining the difference is selected on a macroblock unit basis. According to the B picture (Bidirectionally predictive-coded picture), three kinds of pictures, namely, the I picture or P picture which is preceding with respect to time and has already been decoded, the I picture or P picture which is subsequent with respect to time and has already been decoded, and an interpolated picture formed from both of them are used as a predictive picture (image serving as a reference to obtain a difference). Either the highest efficiency encoding between the encoding of the difference among those three kinds of pictures after the motion compensation and the intra-encoding is selected on a macroblock unit basis.

Therefore, as macroblock types, there are an intra-frame coded (Intra) macroblock, a forward direction inter-frame predictive macroblock in which the future is predicted from the past, a backward direction inter-frame predictive macroblock in which the past is predicted from the future, and a bidirectional macroblock which is predicted from both forward and backward directions. All of the macroblocks in the I picture are intra-frame coded macroblocks. The intra-frame coded macroblocks and the forward direction inter-frame predictive macroblocks are included in the P picture. The macroblocks of all of the four kinds of types mentioned above are included in the B picture.

At least one I picture is included in the GOP and the absence of the P and B pictures is permitted. The top sequence layer is constructed by the header portion and a plurality of GOPs.

In the format of MPEG, the slice denotes one variable length code series. The variable length code series is such a series that unless a variable length code is decoded, a boundary of data cannot be detected.

An identification code (referred to as a start code) having a predetermined bit pattern arranged on a byte unit basis is arranged at the head of each of the sequence layer, GOP layer, picture layer, and slice layer. The header portion of each layer mentioned above is a portion in which a header and expansion data or user data are collectively described. A size (the numbers of pixels in the vertical and lateral directions) of image (picture) and the like are described in the header of the sequence layer. A time code, the number of pictures constructing the GOP, and the like are described in the header of the GOP layer.

The macroblock included in the slice layer is a set of a plurality of DCT blocks. A coded series of the DCT block is a series in which a series of quantized DCT coefficients is variable length coded while the number of times of continuation (run) of coefficient 0 and a non-0 series (level) just after the run are set to one unit. The ID code arranged on a byte unit basis is not added to the macroblock and the DCT block in the macroblock. That is, they are not one variable length code series.

The macroblocks are obtained by dividing a picture plane (picture) into lattice-shaped regions of (16 pixels×16 lines). The slice is formed by, for example, coupling the macroblocks in the horizontal direction. The last macroblock of the slice before the continuous slices is continuous with the head macroblock of the next slice. It is not permitted that an overlap of the macroblocks is formed between the slices. When the size of picture is determined, the number of macroblocks per picture is unconditionally decided.

It is desirable to edit on the coded data in order to avoid a deterioration of the signal due to the decoding and encoding. In this instance, in order to decode the P picture and the B picture, the picture that is preceding with respect to time or the pictures which are preceding and subsequent with respect to time are necessary. Therefore, the editing unit cannot be set to one-frame unit. In consideration of this point, in the embodiment, one GOP is constructed by one I picture.

A recording area where recording data of, for example, one frame is recorded is set to a predetermined area. Since the variable length coding is used in MPEG2, an amount of generation data of one frame is controlled so that the data which is generated in a 1-frame period can be recorded in a predetermined recording area. Further, in the embodiment, one slice is constructed by one macroblock and one macroblock is allocated to a fixed frame of a predetermined length so as to be adapted to the recording onto the magnetic tape.

Figure 8:
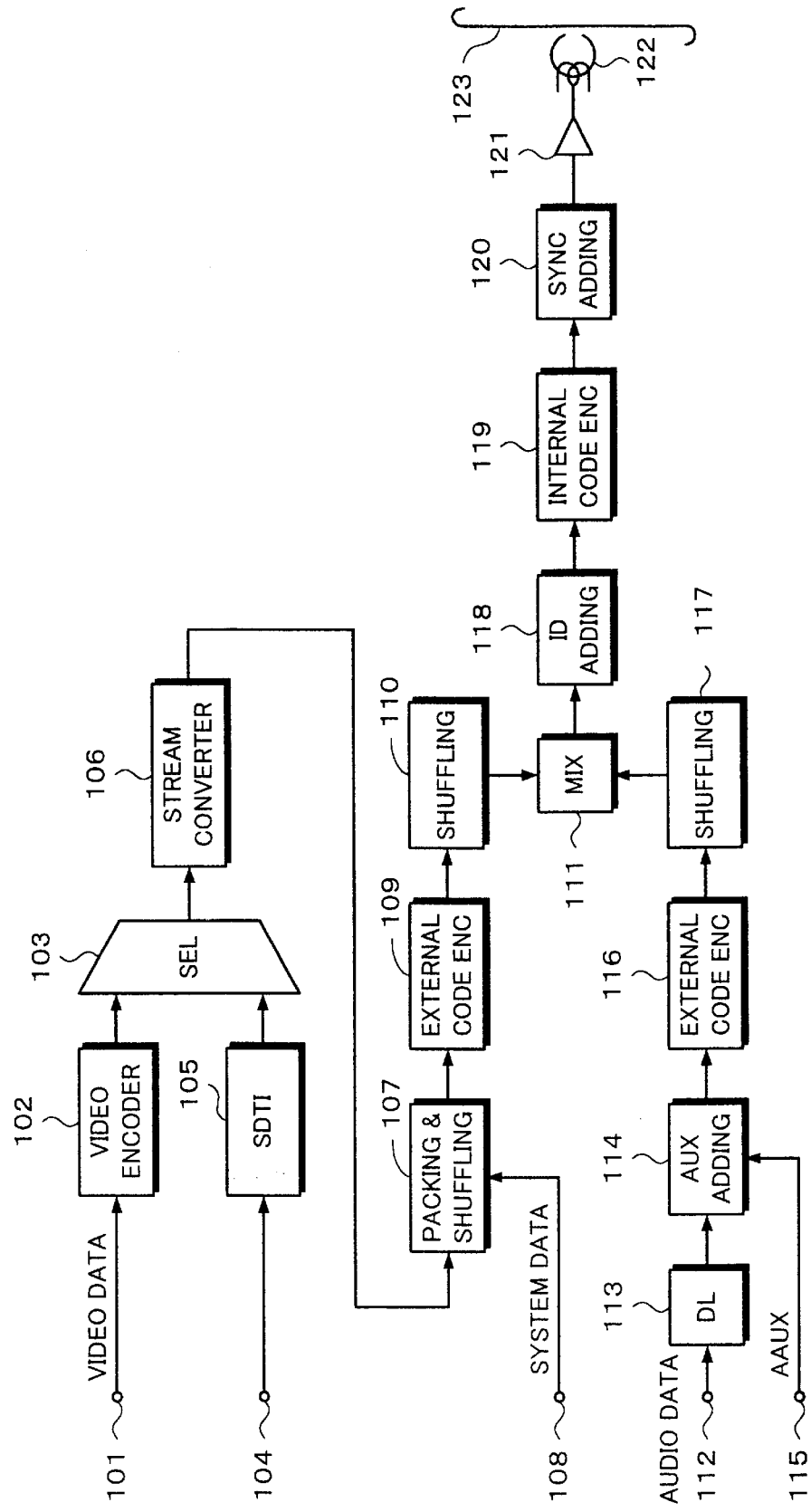
FIG. 8 is a block diagram showing a construction on the recording side according to an embodiment of the invention.

FIG. 8 shows an example of a construction on the recording side of a recording/reproducing apparatus according to the embodiment. Upon recording, a digital video signal is inputted from a terminal 101 via a receiving unit of a predetermined interface such as SDI (Serial Data Interface). The SDI is an interface specified by SMPTE in order to transmit a (4:2:2) component video signal, a digital audio signal, and additional data. The input video signal is subjected to a DCT (Discrete Cosine Transform) process in a video encoder 102 and converted into coefficient data. The coefficient data is variable length coded. The variable length coded (VLC) data from the video encoder 102 is an elementary stream which conforms with MPEG2. This output is supplied to one input terminal of a selector 103.

Data of an SDTI (Serial Data Transport Interface) format as an interface specified by ANSI/SMPTE 305M is inputted via an input terminal 104. This signal is sync-detected by an SDTI receiving unit 105 and once stored in a buffer and the elementary stream is extracted therefrom. The extracted elementary stream is supplied to another input terminal of the selector 103.

The elementary stream selected and outputted by the selector 103 is supplied to a stream converter 106. In the stream converter 106, DCT coefficients arranged every DCT block on the basis of the rules of MPEG2 are combined every frequency component via a plurality of DCT blocks constructing one macroblock and the combined frequency components are rearranged. The rearranged conversion elementary stream is supplied to a packing and shuffling unit 107.

Since the video data of the elementary stream has been variable length coded, lengths of data of the respective macroblocks are not uniform. In the packing and shuffling unit 107, the macroblocks are filled into the fixed frame. In this instance, the portions overflowed from the fixed frame are sequentially filled into the remaining portion as compared with the size of fixed frame. System data such as a time code and the like is supplied from an input terminal 108 to the packing and shuffling unit 107 and subjected to a recording process in a manner similar to the picture data. A shuffling for rearranging the macroblocks of one frame which are generated in the scanning order and distributing the recording positions of the macroblocks on the tape is performed. Even when the data is intermittently reproduced by the shuffling in a variable speed reproducing mode, an updating ratio of the picture can be improved.

The video data and system data (hereinafter, even when the video data includes the system data, such video data is merely called video data while excluding a case where it is particularly necessary) are supplied to an external code encoder 109. A product code is used as an error correction code for the video data and audio data. The product code is used for performing a coding of an external code in the vertical direction of a 2-dimensional array of the video data or audio data and performing a coding of an internal code in the lateral direction of the array, thereby coding data symbols twice. Reed-Solomon code can be used as an external code and an internal code.

An output of the external code encoder 109 is supplied to a shuffling unit 110 and a shuffling for rearranging the order on a sync block unit basis over a plurality of ECC blocks is performed. Such a situation that errors are concentrated to a specific ECC block is prevented by the shuffling of the sync block units. The shuffling which is performed in the shuffling unit 110 is also called an interleave. An output of the shuffling unit 110 is supplied to a mixing unit 111 and mixed with the audio data. The mixing unit 111 is constructed by a main memory as will be explained hereinlater.

The audio data is supplied from an input terminal 112. In the embodiment, a non-compression digital audio signal is handled. The digital audio signal is a signal separated by an SDI receiving unit (not shown) on the input side or the SDTI receiving unit 105 or a signal inputted via an audio interface. The input digital audio signal is supplied to an AUX adding unit 114 via a delay unit 113. The delay unit 113 is used to match the timings of the audio signal and video signal. An audio AUX which is supplied from an input terminal 115 is auxiliary data, namely, data having information (associated with the audio data) such as a sampling frequency and the like of the audio data. The audio AUX is added to the audio data by the AUX adding unit 114 and handled in a manner similar to the audio data.

The audio data and AUX (hereinafter, the audio data including AUX is also merely referred to as audio data except for a case where it is especially necessary) from the AUX adding unit 114 are supplied to an external code encoder 116. The external code encoder 116 performs an encoding of the external code to the audio data. An output of the external code encoder 116 is supplied to a shuffling unit 117 and subjected to a shuffling process. A shuffling of a sync block unit and a shuffling of a channel unit are performed as an audio shuffling.

An output of the shuffling unit 117 is supplied to the mixing unit 111 and the video data and audio data are mixed with data of one channel. An output of the mixing unit 111 is supplied to an ID adding unit 118. An ID having information showing a sync block number and the like is added by the ID adding unit 118. An output of the ID adding unit 118 is supplied to an internal code encoder 119 and subjected to an encoding of an internal code. Further, an output of the internal code encoder 119 is supplied to a sync adding unit 120 and a sync signal is added to the output every sync block. By adding the sync signal, recording data in which the sync blocks are continuous is constructed. The recording data is supplied to a rotary head 122 via a recording amplifier 121 and recorded onto a magnetic tape 123. The rotary head 122 is constructed actually in such a manner that a plurality of magnetic heads in which azimuths of heads to form the adjacent tracks are different are attached to a rotary drum.

A scrambling process can be performed to the recording data as necessary. A digital modulation can be also performed upon recording. Further, Partial Response Class 4 and a Viterbi code can be also used.

Figure 9:
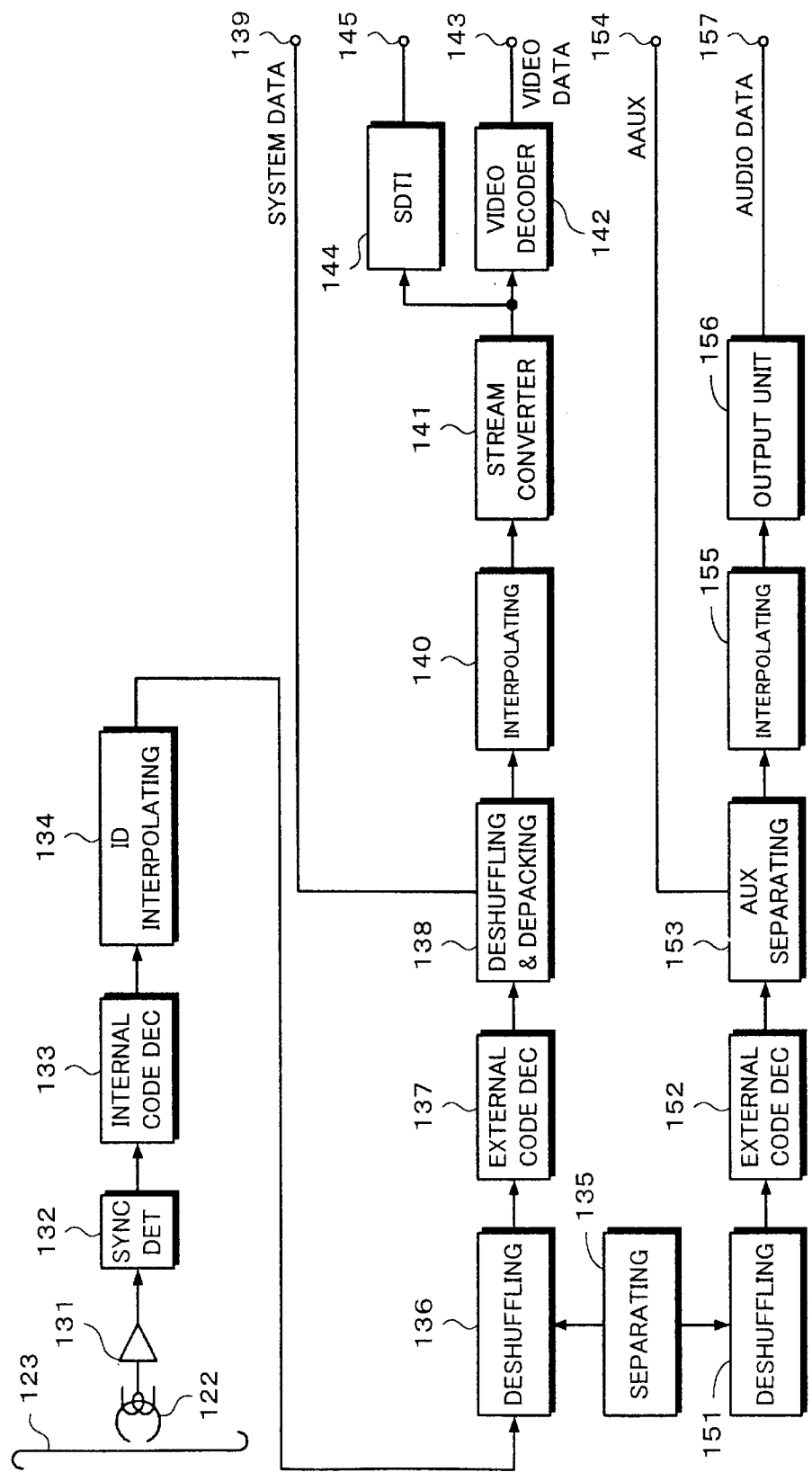
FIG. 9 is a block diagram showing a construction on the reproducing side according to an embodiment of the invention.

FIG. 9 shows an example of a construction on the reproducing side of the embodiment in the invention. A reproduction signal reproduced from the magnetic tape 123 by the rotary head 122 is supplied to a sync detecting unit 132 via a reproducing amplifier 131. A process such as equalization, waveform shaping, or the like is performed to the reproduction signal. A demodulation of the digital modulation, a Viterbi decoding, or the like is performed as necessary. The sync detecting unit 132 detects the sync signal added to the head of the sync block. The sync block is extracted by the sync detection.

An output of the sync detecting unit 132 is supplied to an internal code decoder 133 and subjected to an error correction of an internal code. An output of the internal code decoder 133 is supplied to an ID interpolating unit 134 and the ID of the sync block which has been determined to be an error by the internal code, for example, the sync block number is interpolated. An output of the ID interpolating unit 134 is supplied to a separating unit 135 and the video data and the audio data are separated. As mentioned above, the video data denotes the DCT coefficient data and system data which were generated by the intra-coding of MPEG, and the audio data denotes the PCM (Pulse Code Modulation) data and AUX.

The video data from the separating unit 135 is subjected to a process opposite to the shuffling by a deshuffling unit 136. The deshuffling unit 136 executes a process for returning the shuffling of the sync block unit performed by the shuffling unit 110 on the recording side to the original state. An output of the deshuffling unit 136 is supplied to an external code decoder 137 and subjected to an error correction by an external code. When uncorrectable errors occur, an error flag indicative of the presence or absence of the errors is set to a status showing the presence of the errors.

An output of the external code decoder 137 is supplied to a deshuffling and depacking unit 138. The deshuffling and depacking unit 138 executes a process for returning the shuffling of the macroblock unit performed by the packing and shuffling unit 107 on the recording side to the original state. In the deshuffling and depacking unit 138, the packing performed upon recording is depacked. That is, the length of data is returned to the original length on a macroblock unit basis and the original variable length code is reconstructed. Further, in the deshuffling and depacking unit 138, the system data is decomposed and taken out to an output terminal 139.

An output of the deshuffling and depacking unit 138 is supplied to an interpolating unit 140 and the data in which the error flag is set to "1" (namely, there are errors) is concealed. That is, when it is determined that there are errors in the halfway of the macroblock data before the conversion, the DCT coefficients of the frequency components after the position where the errors occurred cannot be reconstructed. Therefore, for example, the data existing at the error position is replaced by an end of block code (EOB) and the DCT coefficients of the subsequent frequency components are set to "0". Similarly, also in the high speed reproducing mode, only the DCT coefficients up to a position of the length corresponding to the sync block length are reconstructed and the subsequent coefficients are replaced by zero data. Further, in the interpolating unit 140, when an error occurs in the header added to the head of the video data, a process for recovering the header (sequence header, GOP header, picture header, user data, etc.) is also performed.

Since the DCT coefficients are arranged in a range of the DC component and from the low frequency component to the high frequency component so as to extend over the DCT blocks, even if the DCT coefficients are ignored after a certain point as mentioned above, the DCT coefficients from DC and low frequency component can be uniformly allocated to each of the DCT blocks constructing the macroblock.

An output of the interpolating unit 140 is supplied to a stream converter 141. In the stream converter 141, a process opposite to that of the stream converter 106 on the recording side is performed. That is, the DCT coefficients arranged every frequency component so as to extend over the DCT blocks are rearranged every DCT block. Thus, the reproduction signal is converted to the elementary stream which conforms with MPEG2.

As for an input/output of the stream converter 141, a sufficiently high transfer rate (band width) is assured in accordance with the maximum length of the macroblock in a manner similar to the recording side. When the length of macroblock is not limited, it is desirable to assure the band width that is 3 times as wide as the pixel rate.

The output of the stream converter 141 is supplied to a video decoder 142. The video decoder 142 decodes the elementary stream and outputs the video data. That is, the video decoder 142 performs an inverse quantizing process and an inverse DCT process. The decoded video data is taken out to an output terminal 143. For example, SDI is used as an interface with the outside. The elementary stream from the stream converter 141 is supplied to an SDTI transmitting unit 144. Although a path is not shown, the system data, reproduction audio data, and AUX are also supplied to the SDTI transmitting unit 144 and converted into a stream having a data structure of the SDTI format. The stream from the SDTI transmitting unit 144 is outputted to the outside via an output terminal 145.

The audio data separated by the separating unit 135 is supplied to a deshuffling unit 151. The deshuffling unit 151 performs a process opposite to the shuffling performed in the shuffling unit 117 on the recording side. An output of the deshuffling unit 151 is supplied to an external code decoder 152 and subjected to an error correction by the external code. The error corrected audio data is outputted from the external code decoder 152. The error flag is set with respect to the data having uncorrectable errors.

An output of the external code decoder 152 is supplied to an AUX separating unit 153 and the audio AUX is separated. The separated audio AUX is taken out to an output terminal 154. The audio data is supplied to an interpolating unit 155. In the interpolating unit 155, a sample having an error is interpolated. As an interpolating method, a mean value interpolation for interpolating the erroneous sample by a mean value of the correct data which are preceding and subsequent with respect to time, a previous value holding method of holding the value of the previous correct sample, or the like can be used. An output of the interpolating unit 155 is supplied to an output unit 156. The output unit 156 executes a muting process for inhibiting the output of the erroneous audio signal which cannot be interpolated and a delay amount adjusting process for matching the timing with the video signal. The reproduction audio signal is taken out of the output unit 156 to an output terminal 157.

Although not shown in FIGS. 8 and 9, a timing generating unit for generating a timing signal synchronized with the input data, a system controller (microcomputer) for controlling the whole operation of the recording/reproducing apparatus, and the like are provided.

In the embodiment, the signal is recorded onto the magnetic tape by a helical scan system for forming an inclined track by the magnetic heads provided on the rotary head which is rotated. A plurality of magnetic heads are provided at positions which face each other on the rotary drum. That is, when the magnetic tape is wrapped around the rotary drum at a wrap angle of about 180°, a plurality of tracks can be simultaneously formed by the rotation of 180° of the magnetic heads. One set is formed by two magnetic heads having different azimuths. A plurality of magnetic heads are arranged so that the azimuths of the adjacent tracks are different.

Figure 3:
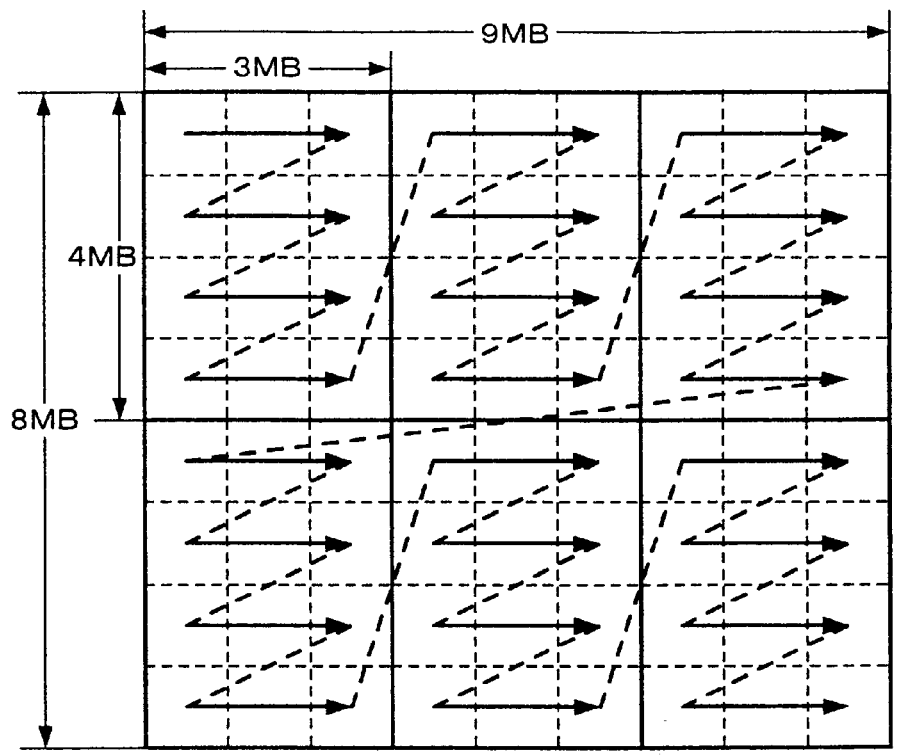
FIG. 3 is a schematic diagram for explaining the conventional shuffling process.
Figure 4:
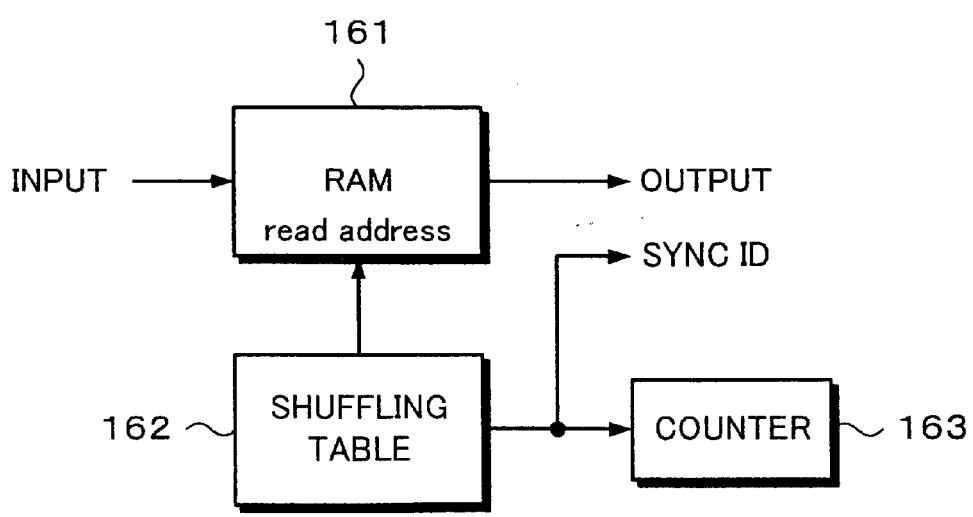
FIG. 4 is a block diagram showing an example of a construction for realizing the conventional shuffling process.
Figure 7A:
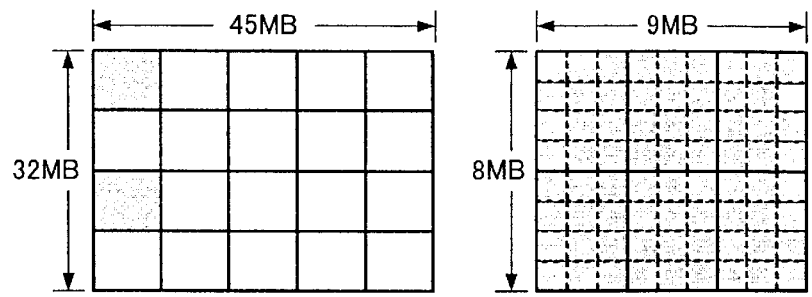
FIGS. 7A to 7E are schematic diagrams for explaining positions of data obtained in the high speed reproducing mode.
Figure 7B:
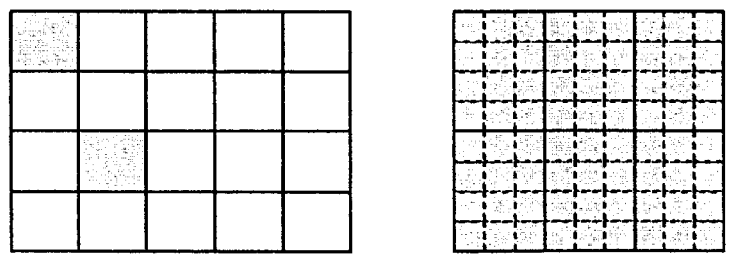
Figure 7C:
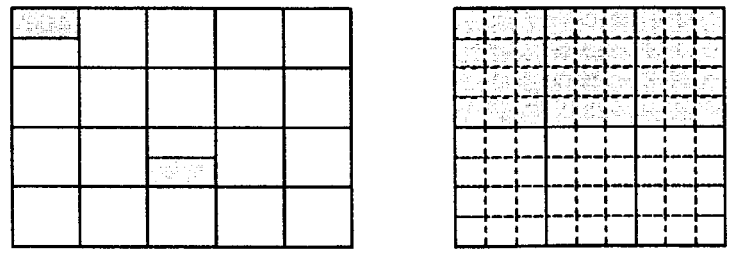
Figure 7D:
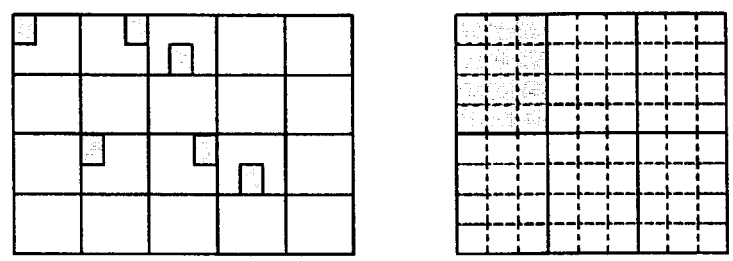
Figure 7E:
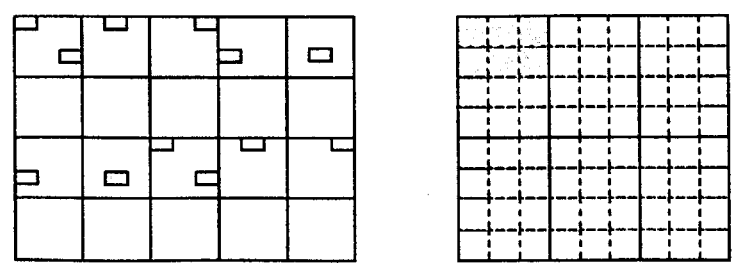
Figure 10:
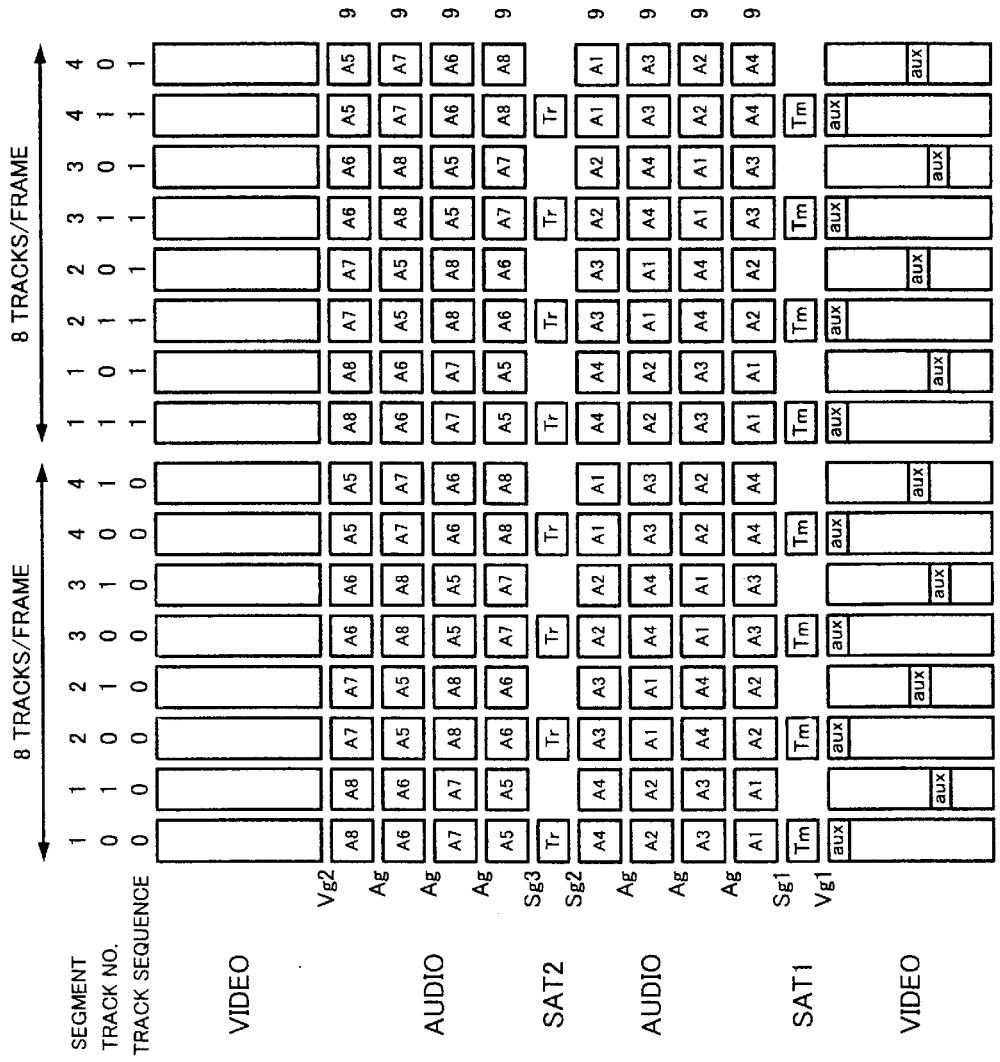
FIG. 10 is a schematic diagram showing an example of a track format.

FIG. 10 shows an example of a track format of the tracks which are formed on the magnetic tape by the foregoing rotary head. It is an example in which the video and audio data per frame are recorded on 8 tracks. For example, the interlace signal (480i signal) and audio signal in which a frame frequency is equal to 29.97 Hz, a rate is equal to 50 Mbps, the number of valid lines is equal to 480, and the number of valid horizontal pixels is equal to 720 are recorded. The interlace signal (576i signal) and audio signal in which a frame frequency is equal to 25 Hz, a rate is equal to 50 Mbps, the number of valid lines is equal to 576, and the number of valid horizontal pixels is equal to 720 can be also recorded by the same tape format as that in FIG. 3.

One segment is constructed by two tracks of different azimuths. That is, 8 tracks are constructed by 4 segments. Track numbers [0] and [1] corresponding to the azimuths are allocated to one set of tracks constructing the segment. In the example shown in FIG. 10, the track numbers are exchanged between the former half 8 tracks and the latter half 8 tracks and a different track sequence is allocated every frame. By this construction, even if one of the set of magnetic heads having different azimuths enters a read-impossible state due to, for example, choking or the like, an influence by the errors can be minimized by using the data of the previous frame.

In each track, a video sector in which the video data is recorded on both end sides is arranged and an audio sector in which the audio data is recorded is arranged so as to be sandwiched between the video sectors. FIG. 10 and FIGS. 11A to 11C, which will be explained hereinlater, show arrangements of the audio sectors on the tape.

In the track format of FIG. 10, the audio data of 8 channels can be handled. A1 to A8 denote sectors of the channels ch1 to ch8 of the audio data. An array of the audio data is changed on a segment unit basis and the array-changed audio data is recorded. As for the audio data, audio samples which are generated in the 1-field period (for example, in the case where a field frequency is equal to 29.97 Hz and a sampling frequency is equal to 48 kHz, 800 samples or 801 samples) are divided into a group of the even-number designated samples and a group of the odd-number designated samples, and one ECC block is constructed by each sample group and the AUX.

In FIG. 10, since the data of one field is recorded onto four tracks, two ECC blocks per channel of the audio data are recorded onto four tracks. The data (including an external code parity) of two ECC blocks is divided into four sectors and distributed and recorded on four tracks as shown in FIG. 10. A plurality of sync blocks included in the two ECC blocks are shuffled. For example, two ECC blocks of channel 1 are constructed by four sectors to which the reference numeral A1 has been allocated.

In this example, as for the video data, the data of 4 ECC blocks is shuffled (interleaved) for one track and divided into each sector on the upper side and lower side and recorded. A system area is provided at a predetermined position in the video sector on the lower side.

In FIG. 10, SAT1(Tm) and SAT2(Tr) denote areas where a signal for servo lock is recorded. Gaps (Vg1, Sg1, Ag, Sg2, Sg3, and Vg2) having a predetermined size are provided between the respective recording areas.

Figure 11A:
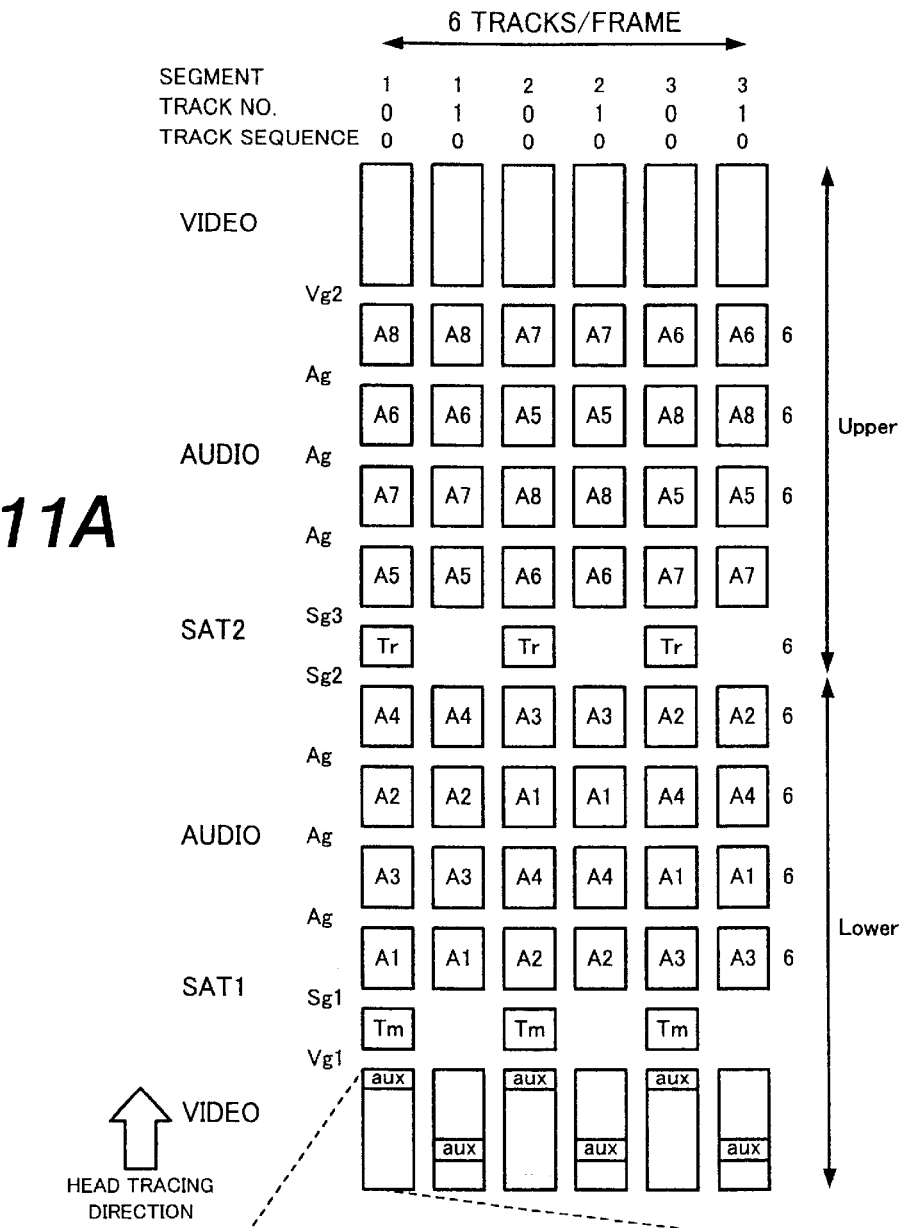
FIGS. 11A to 11C are schematic diagrams showing another example of a track format.

FIG. 10 shows an example in which the data per frame is recorded onto 8 tracks. The data per frame can be recorded onto 4 tracks, 6 tracks, or the like in dependence on a format of the data to be recorded or reproduced. FIG. 11A shows a format of 6 tracks per frame. In this example, the track sequence is set to only [0].

Figure 11B:
Figure 11C:
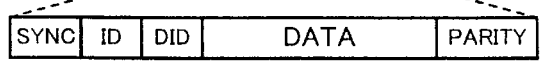

As shown in FIG. 11B, the data which is recorded on the tape comprises a plurality of blocks which are called sync blocks and partitioned at regular intervals. FIG. 11C schematically shows a construction of the sync block. Although the details will be explained later, the sync block is constructed by: an SYNC pattern for synchronous detection; an ID to identify each sync block; a DID showing contents of the data; a data packet; and an internal code parity for error correction. The data is handled as a packet on a sync block unit basis. That is, the minimum data unit which is recorded or reproduced is one sync block. For example, a video sector is formed (FIG. 11A) by arranging a number of sync blocks (FIG. 11B).

FIG. 12 more specifically shows a data construction of the sync block of the video data serving as a minimum unit for recording/reproduction. In the embodiment, data (VLC data) of one or two macroblocks is stored for one sync block in accordance with the format of the video data to be recorded and the size of one sync block, namely, the length is changed in accordance with the format of the video signal. As shown in FIG. 12A, one sync block comprises (from the head): an SYNC pattern of 2 bytes; an ID of 2 bytes; a DID of 1 byte; a data area which is variably specified between, for example, 112 to 206 bytes; and a parity (internal code parity) of 12 bytes. The data area is also called a payload.

The head SYNC pattern of 2 bytes is used for sync detection and has a predetermined bit pattern. The sync detection is performed by detecting the SYNC pattern which coincides with the peculiar pattern.

FIG. 13A shows an example of a bit assignment of ID0 and ID1. The ID has significant information which the sync block peculiarly has and two bytes (ID0 and ID1) are allocated thereto. Identification information (SYNC ID) to identify each sync block in one track is stored in ID0. SYNC ID denotes, for example, a serial number allocated to the sync blocks in each sector. SYNC ID is expressed by 8 bits. SYNC ID is individually allocated to the video sync block and the audio sync block.

Information regarding the track of the sync block is stored in ID1. Assuming that the MSB side is set to bit 7 and the LSB side is set to bit 0, with respect to this sync block, either the upper side (Upper) or lower side (Lower) of the track is shown by bit 7, and the segments of the track are shown by bit 5 to bit 2. Bit 1 indicates the track number corresponding to the azimuth of the track. Bit 0 is a bit to distinguish whether the sync block indicates the video data or the audio data.

FIG. 13B shows an example of a bit assignment of the DID in case of the video. Information regarding the payload is stored in DID. The contents of the DID differ in dependence on the video and audio on the basis of the value of bit 0 of ID1 mentioned above. Bit 7 to bit 4 are undefined (Reserved). Bit 3 and bit 2 denote a mode of the payload and, for example, a type of the payload is shown. Bit 3 and bit 2 are auxiliary bits. Bit 1 shows that one or two macroblocks are stored in the payload. Bit 0 indicates whether the video data which is stored in the payload is the external code parity or not.

FIG. 13C shows an example of a bit assignment of the DID in case of the audio. Bit 7 to bit 4 are reserved. Bit 3 indicates whether the data stored in the payload is the audio data or general data. If the compression encoded audio data has been stored in the payload, bit 3 is set to the value showing the data. Information of the 5-field sequence in the NTSC system is stored in bit 2 to bit 0. That is, in the NTSC system, in case of the sampling frequency of 48 kHz, the audio signal is set to 800 or 801 samples as compared with one field of the video signal and this sequence is aligned every five fields. The position on the sequence where the sample exists is shown by bit 2 to bit 0.

Explanation will be made with reference to FIGS. 12A to 12E again. FIGS. 12B to 12E show examples of the foregoing payload. FIGS. 12B and 12C show examples in the case where the video data (variable length coded data) of one and two macroblocks are stored into the payload, respectively. In the example in which one macroblock is stored as shown in FIG. 12B, length information LT showing the length of subsequent macroblock is arranged in head three bytes. The length information LT can also include its own length or it is not always necessary to include it. In the example in which two macroblocks are stored as shown in FIG. 12C, length information LT of the first macroblock is arranged at the head and subsequently the first macroblock is arranged. After the first macroblock, the length information LT showing the length of the second macroblock is arranged. Subsequently, the second macroblock is arranged. The length information LT is information necessary for depacking.

FIG. 12D shows an example in the case where video AUX (auxiliary) data is stored into the payload. A length of video AUX data is written in the head length information LT. Subsequently to the length information LT, system information of 5 bytes, PICT information of 12 bytes, and user information of 92 bytes are stored. A remaining portion for the length of payload is reserved.

FIG. 12E shows an example in the case where the audio data is stored in the payload. The audio data can be fitted to the whole length of the payload. The audio signal is handled in, for example, a PCM format in which a compressing process or the like is not performed. The invention is not limited to it but the audio data which was compression coded by a predetermined system can be also handled.

In the embodiment, since the length of payload as a storage area of the data of each sync block is set to the optimum length for each of the video sync block and the audio sync block, those lengths are not equal. A length of sync block to record the video data and a length of sync block to record the audio data are set to the optimum lengths in accordance with the signal format, respectively. Thus, a plurality of different signal formats can be integrally handled.

Figure 14A:
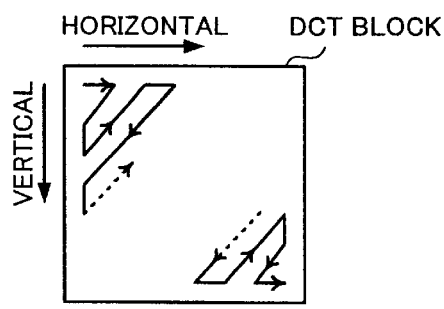
FIGS. 14A and 14B are schematic diagrams for explaining an outputting method and a variable length coding of a video encoder.
Figure 14B:
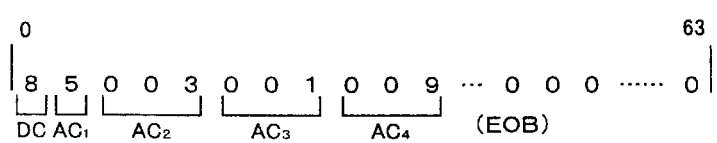

FIG. 14A shows an order of DCT coefficients in the video data which is outputted from the DCT circuit of the MPEG encoder. In the DCT block, the scan is started from the upper left DC component and the DCT coefficients are zigzag scanned in such a direction as to raise horizontal and vertical spatial frequencies and outputted. Thus, as shown in an example in FIG. 14B, total 64 (8 pixels×8 lines) DCT coefficients are arranged in order of the frequency components and obtained.

The DCT coefficients are variable length coded by the VLC unit of the MPEG encoder. That is, the first coefficient is fixed as a DC component and codes are allocated to the subsequent components (AC components) in correspondence to the run of "0" and subsequent levels. Therefore, variable length coded outputs for the coefficient data of the AC components are arranged like $AC_1, AC_2, AC_3, \ldots$ from the coefficient of a low frequency component (low order) to the coefficient of a high frequency component (high order). The elementary stream includes the variable length coded DCT coefficients.

In the stream converter 106, the DCT coefficients of the supplied signal are rearranged. That is, in each macroblock, the DCT coefficients arranged every DCT block in order of the frequency components by the zigzag scan are rearranged in order of the frequency components for each DCT block constructing the macroblock.

Figure 15A:
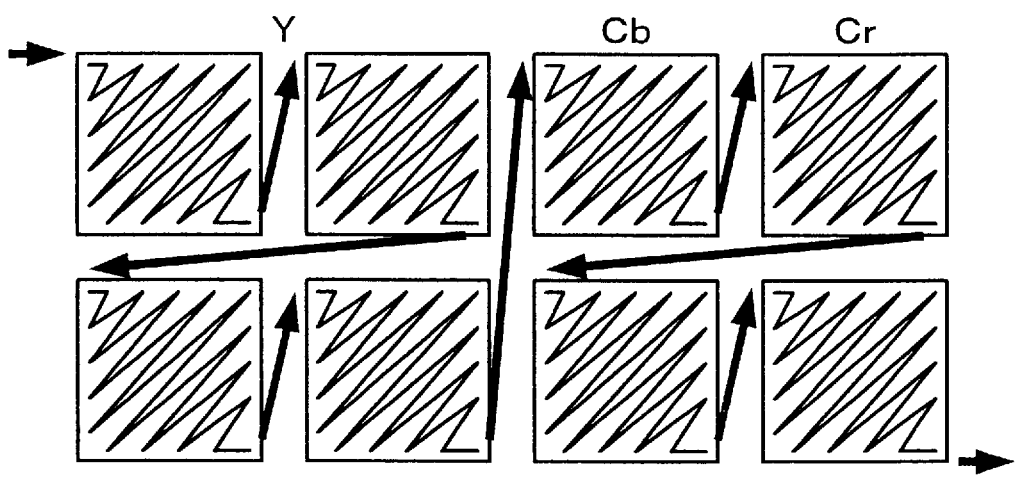
FIGS. 15A and 15B are schematic diagrams for explaining rearrangement of the outputting order of the video encoder.
Figure 15B:
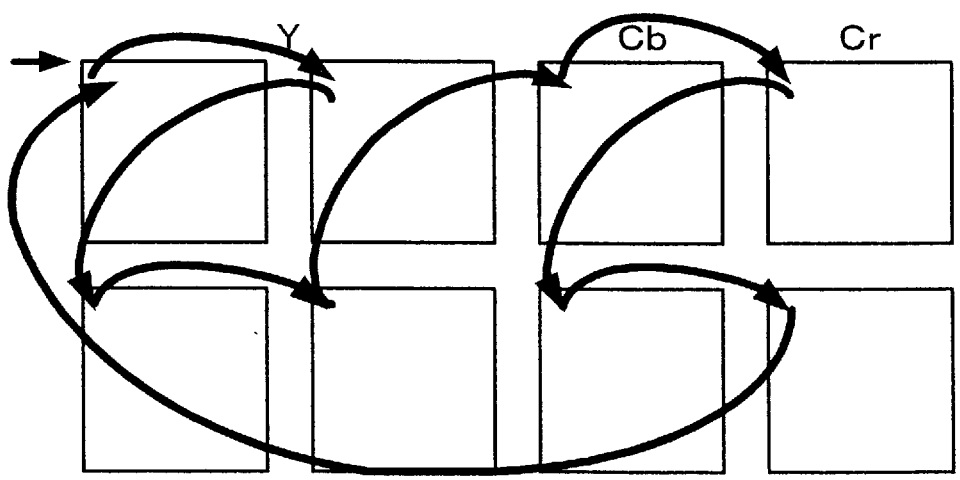

FIGS. 15A and 15B schematically show the rearrangement of the DCT coefficients in the stream converter 106. In case of a (4:2:2) component signal, one macroblock comprises: 4 DCT blocks ($Y_1, Y_2, Y_3, Y_4$) by a luminance signal Y; and every two DCT blocks ($Cb_1, Cb_2; Cr_1, Cr_2$) by chromaticity signals Cb and Cr.

As mentioned above, in the video encoder 102, the zigzag scan is performed in accordance with the rules of MPEG2. As shown in FIG. 15A, the DCT coefficients are arranged every DCT block in order of the frequency components from the DC component and low frequency component to the high frequency component. When the scan of one DCT block is finished, the next DCT block is scanned and the DCT coefficients are similarly arranged.

That is, with respect to each of the DCT blocks $Y_1, Y_2, Y_3$, and $Y_4$ and the DCT blocks $Cb_1, Cr_1, Cb_2,$ and $Cr_2$ in the macroblock, the DCT coefficients are arranged in order of the frequencies from the DC component and low frequency component to the high frequency component. The DCT coefficients are variable length coded so as to allocate the codes to the sets each comprising the continuous run and the subsequent level like $[DC, AC_1, AC_2, AC_3, \ldots]$.

In the stream converter 106, as for the DCT coefficients which were variable length coded and arranged, the variable length codes are once decoded, a delimiter of the respective coefficients is detected, and the DCT components are collected every frequency component so as to extend over each DCT block constructing the macroblock. This state is shown in FIG. 15B. First, the DC components of the 8 DCT blocks in the macroblock are combined. Subsequently, the AC coefficient components of the lowest frequency component of the 8 DCT blocks are combined. In a manner similar to the above, the AC coefficients of the same degree are sequentially combined, thereby rearranging the coefficient data so as to extend over the 8 DCT blocks.

The rearranged coefficient data is as follows.

$DC(Y_1)$, $DC(Y_2)$, $DC(Y_3)$, $DC(Y_4)$, $DC(Cb_1)$, $DC(Cr_1)$, $DC(Cb_2)$, $DC(Cr_2)$, $AC_1(Y_1)$, $AC_1(Y_2)$, $AC_1(Y_3)$, $AC_1(Y_4)$, $AC_1(Cb_1)$, $AC_1(Cr_1)$, $AC_1(Cb_2)$, $AC_1(Cr_2)$, ... As described with reference to FIGS. 14A and 14B, each of DC, $AC_1$, $AC_2$, ... denotes a code of the variable length code allocated to the set comprising the run and the subsequent level.

The conversion elementary stream in which the order of the coefficient data has been rearranged by the stream converter 106 is supplied to the packing and shuffling unit 107. The length of data of the macroblock of the conversion elementary stream is the same as that of the elementary stream before the conversion. In the video encoder 102, even if the length has been set to the fixed length on a GOP (one frame) unit basis by the bit rate control, the length fluctuates in the macroblock unit. In the packing and shuffling unit 107, the data of the macroblock is fitted into the fixed frame.

Figure 16A:
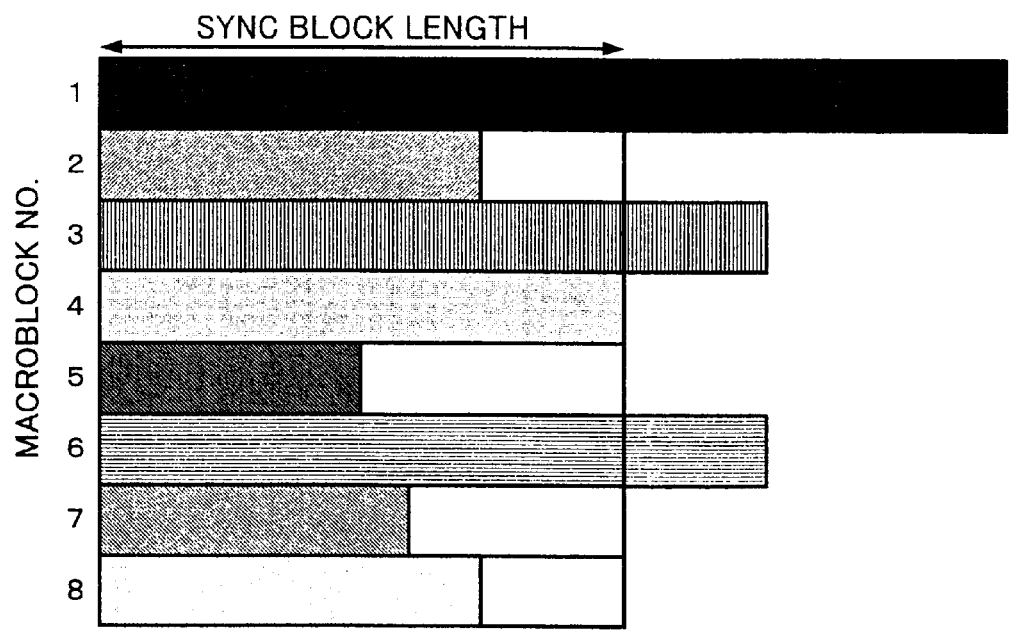
FIGS. 16A and 16B are schematic diagrams for explaining a process for packing data whose order has been rearranged into the sync block.
Figure 16B:
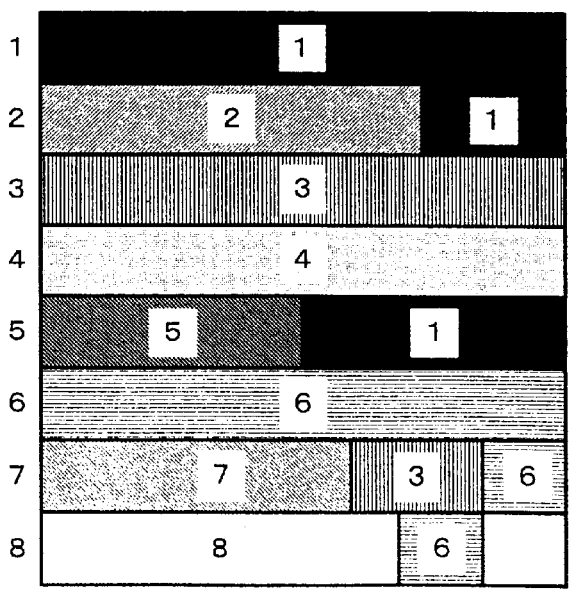

FIGS. 16A and 16B schematically show the packing process of the macroblock in the packing and shuffling unit 107. The macroblock is fitted to the fixed frame having a predetermined data length and packed. The data length of the fixed frame which is used in this instance is made coincident with the sync block length as a minimum unit of the data upon recording and reproduction. This is because it is intended to easily perform the shuffling process and the error correction coding process. In FIGS. 16A and 16B, for simplicity of explanation, it is assumed that 8 macroblocks are included in one frame.

As shown in an example in FIG. 16A, the lengths of 8 macroblocks are made different due to the variable length coding. In this example, as compared with the length of one sync block as a fixed frame, the data of the macroblock #1, the data of the macroblock #3, and the data of the macroblock #6 are long and the data of the macroblock #2, the data of the macroblock #5, the data of the macroblock #7, and the data of the macroblock #8 are short, respectively. A length of data of the macroblock #4 is almost equal to that of one sync block.

The macroblocks are fitted to the fixed length frame of the length of one sync block by the packing process. The reason why the optimum amount of data can be fitted is because an amount of data which is generated in the 1-frame period is controlled to be a fixed amount. As shown in an example in FIG. 16B, the macroblock which is longer than the one sync block is divided at the positions corresponding to the sync block length. Among the divided macroblocks, the portion (overflow portion) overflowed from the sync block length is stored into an empty area in order from the head, namely, stored after the macroblock whose length is shorter than the sync block length.

In the example of FIG. 16B, the portion overflowed from the sync block length of the macroblock #1 is first stored after the macroblock #2. When this portion reaches the length of sync block, the overflow portion is stored after the macroblock #5. Subsequently, the portion overflowed from the sync block length of the macroblock #3 is stored after the macroblock #7. Further, the overflow portion is stored after the macroblock #8. In this manner, each macroblock is packed for the fixed frame of the sync block length.

The length of each macroblock can be previously examined in the stream converter 106. In the packing and shuffling unit 107, thus, the last part of the data of the macroblock can be known without decoding the VLC data and checking the contents.

Figure 17A:
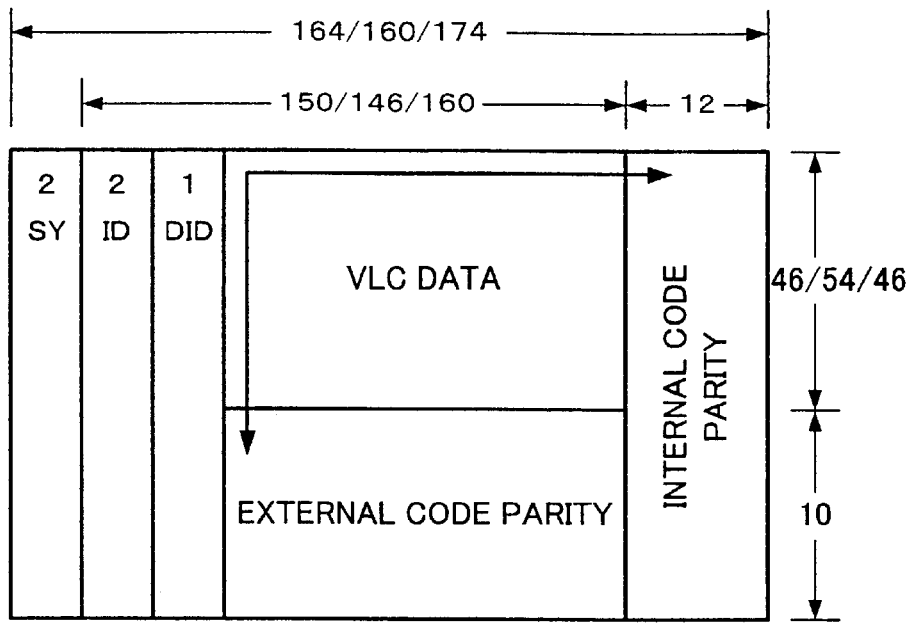
FIGS. 17A and 17B are schematic diagrams for explaining error correction codes for video data and audio data.
Figure 17B:
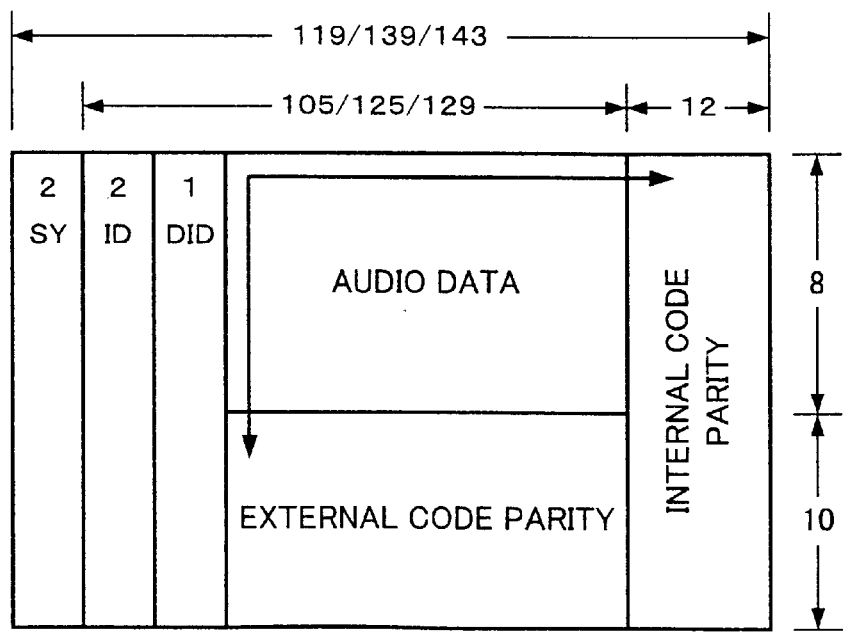

FIGS. 17A and 17B show examples of error correction codes which are used in the embodiment. FIG. 17A shows one ECC block of the error correction code for the video data. FIG. 17B shows one ECC block of the error correction code for the audio data. In FIG. 17A, the VLC data is the data from the packing and shuffling unit 107. An SYNC pattern, an ID, and a DID are added to each line of the VLC data. Further, one SYNC block is formed by adding an internal code parity.

That is, an external code parity is formed from a predetermined number of symbols (bytes) arranged in the vertical direction of the array of the VLC data. An internal code parity of 10 bytes is formed from a predetermined number of symbols (bytes) of the ID, DID, and VLC data (or external code parity) arranged in the horizontal direction of the array of the VLC data. In the example of FIG. 17A, 10 symbols of the external code parity and 12 symbols of the internal code parity are added. A Reed-Solomon code is used as a specific error correction code. In FIG. 17A, the reason why the length of VLC data in one SYNC block is different is to cope with the case where the frame frequencies of the video data are different like 59.94 Hz, 25 Hz, and 23.976 Hz.

As shown in FIG. 17B, the product code for the audio data is also used to form an external code parity of 10 symbols and an internal code parity of 12 symbols in a manner similar to the case of the video data. In case of the audio data, for example, the sampling frequency is set to 48 kHz and one sample is quantized to 24 bits. One sample can be also converted to the other number of bits, for example, 16 bits. An amount of audio data in one SYNC block differs in dependence on the difference of the frame frequency mentioned above. As mentioned above, two ECC blocks are constructed by the audio data/channel of one field. The even-number or odd-number designated audio samples and the audio AUX are included as data in one ECC block.

Figure 18:
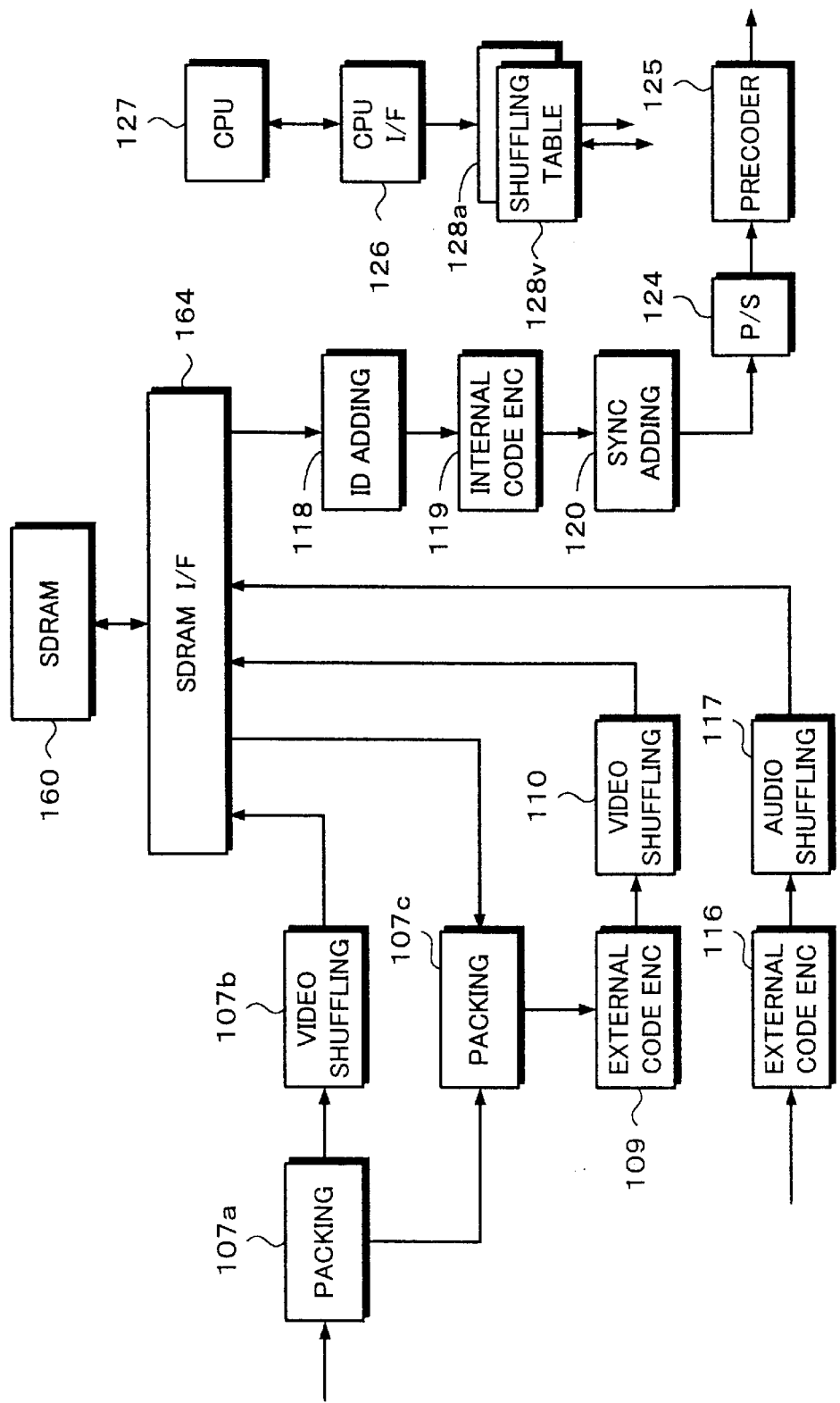
FIG. 18 is a more specific block diagram of a recording signal processing unit.

FIG. 18 shows a more specific construction according to an embodiment of the invention. In FIG. 18, reference numeral 164 denotes an interface of a main memory 160 which is attached to the outside of an IC. The writing/reading operations of the main memory 160 are controlled by the interface 164. The packing and shuffling unit 107 is constructed by a packing unit 107a, a video shuffling unit 107b, and a packing unit 107c.

In the embodiment, with reference to the length information LT of each macroblock, the packing unit 107a separately stores the fixed frame length data and the overflow portion into different areas in the main memory (SDRAM) 160. The area to store the fixed frame length data is an area for a packing process in the main memory 160. In case of a data length shorter than the fixed frame length, an empty area is generated in the fixed frame corresponding to the main memory 160. The video shuffling unit 107b performs the shuffling by controlling a write address in this empty area.

Subsequently, the packing unit 107c executes a process for packing the overflow portion into the memory to the external code encoder 109 and reading. That is, the data of the fixed frame length is read out from the main memory 160 and stored into the memory of one ECC block prepared in the external code encoder 109. If there is an empty area in the data of the fixed frame length, the overflow portion is read there so as to fit the data to the fixed frame length. When the data of one ECC block is read, the reading process is temporarily interrupted and the external code parity is formed by the external code encoder 109. The external code parity is stored into a memory of the external code encoder 109. When the process by the external code encoder 109 as much as one ECC block is finished, the data and the external code parity are rearranged in order of performing the coding of the internal code from the external code encoder 109 and written back into an area for an internal code process different from the area for the packing process in the main memory 160. The video shuffling unit 110 performs the shuffling on the sync block unit basis by controlling the address at the time when the data after completion of the coding of the external code is written back to the main memory 160.

The following processes are executed on an ECC block unit basis: namely, the process for separately writing the data of the fixed frame length and the overflow portion into the first area in the main memory 160 (the first packing process); the process for packing the overflow portion and reading into the memory to the external code encoder 109 (the second packing process); the process for forming the external code parity; and the process for writing back the data and external code parity into the second area in the main memory 160. Since the external code encoder 109 has the memory having the size of ECC block, the number of times of access to the main memory 160 can be reduced.

When the processes of a predetermined number of ECC blocks (for example, 32 ECC blocks) included in one picture are finished, the packing of one picture and the coding of the external code are finished. The data read out of the main memory 160 via the interface 164 is processed by the ID adding unit 118, internal code encoder 119, and sync adding unit 120. Output data of the sync adding unit 120 is converted into bit serial data by a parallel/serial converting unit 124. The serial data which is outputted is processed by a precoder 125 of Partial Response Class 4. This output is digitally modulated as necessary and supplied to the rotary head via the recording amplifier 121.

It is also possible to introduce a sync block in which valid data called a null sync is not arranged into the ECC block and provide flexibility of the construction of the ECC block for a difference of the format of the recording video signal. The null sync is formed in the packing unit 107a of the packing and shuffling unit 107 and written into the main memory 160. Therefore, since the null sync has a data recording area, it can be used as a sync for recording of the overflow portion.

In case of the audio data, the even-number designated samples and the odd-number designated samples of the audio data of one field construct different ECC blocks. Since a series of the external code of ECC is constructed by the audio samples of the input order, the external code encoder 116 forms an external code parity each time the audio sample of the external code series is inputted. By an address control when the output of the external code encoder 116 is written into the main memory, the shuffling unit 117 performs the shuffling (on a channel unit basis or a sync block unit basis).

A CPU interface 126 is further provided, thereby enabling data to be received from a CPU 127 functioning as a system controller. As such data, there are shuffling table data, parameters regarding the format of the recording video signal, and the like. The shuffling table data is stored into a shuffling table (RAM) 128v for video and a shuffling table (RAM) 128a for audio. The shuffling table 128v performs an address conversion for the shuffling processes in the video shuffling unit 107b and shuffling unit 110. The shuffling table 128a performs an address conversion for the shuffling process in the audio shuffling unit 117.

In the embodiment, in order to enable a plurality of input image formats to be recorded by a plurality of data rates, a specified input image format or a shuffling table prepared with respect to a data rate are stored in the shuffling table 128v for video and the shuffling table 128a for audio. The invention relates to, particularly, the shuffling process of video data.

Figure 19:
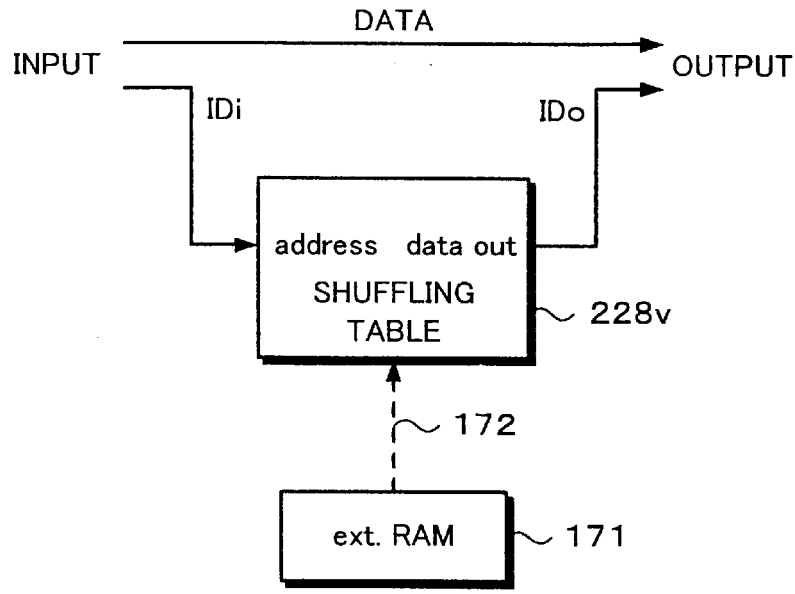
FIG. 19 is a block diagram showing a principle construction of a shuffling unit.
Figure 20:
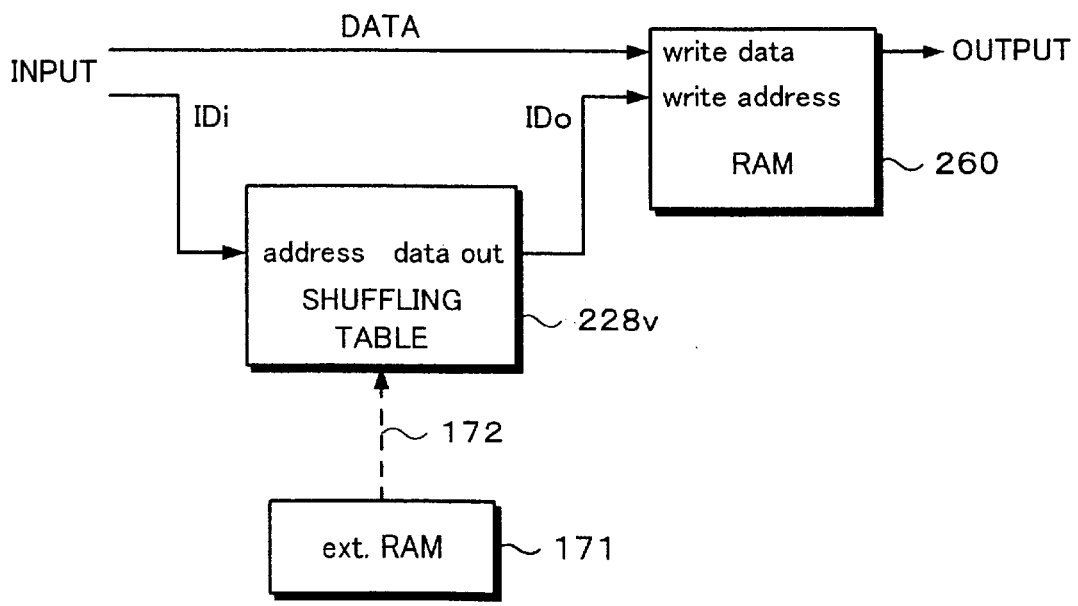
FIG. 20 is a block diagram showing a shuffling unit of a system for controlling a write address in a memory.

FIG. 19 shows a construction for the shuffling process of video data as a principle. An ID (or address) is added to the input video data. The ID can unconditionally express the position of the data by a serial number from the head of a data series, a combination of a base and an offset, or the like. The "shuffling" is nothing but the operation to rewrite the ID. A shuffling table written from an external memory 171 via a path 172 has been stored in the shuffling table 228v.

A plurality of shuffling tables have been stored in the external memory 171 in correspondence to the formats of video data as targets for the shuffling. One shuffling table selected in response to a discrimination result of the format is stored into the shuffling table 228v. The format is discriminated on the basis of, for example, information included in the video data and the CPU selects the proper shuffling table in accordance with the format discrimination result. The reasons why the data is transferred from the external memory 171 into the shuffling table 228v are to assure an operating speed and reduce the number of pins for input/output terminals in the case where the shuffling unit is formed as an IC. As shown in the foregoing embodiment, if the external memory 171 is an RAM or ROM regarding the CPU and the path 172 is constructed by a serial interface of the CPU, it is sufficient to use only one pin for serial transmission. The shuffling table can be also stored by using another general interface.

Like an embodiment, the shuffling is actually often accompanied with the data accumulation as shown in FIG.

20. The input data is written into a memory 260 for accumulating data. The shuffling table 228v receives an IDi, as an address, separated from the input data and generates a converted address IDo, as an output. The address IDo generated from the shuffling table 228v is used as a write address to write data into the memory 260. The shuffled data is read out from the memory 260 on the basis of a read address which sequentially changes.

Figure 21:
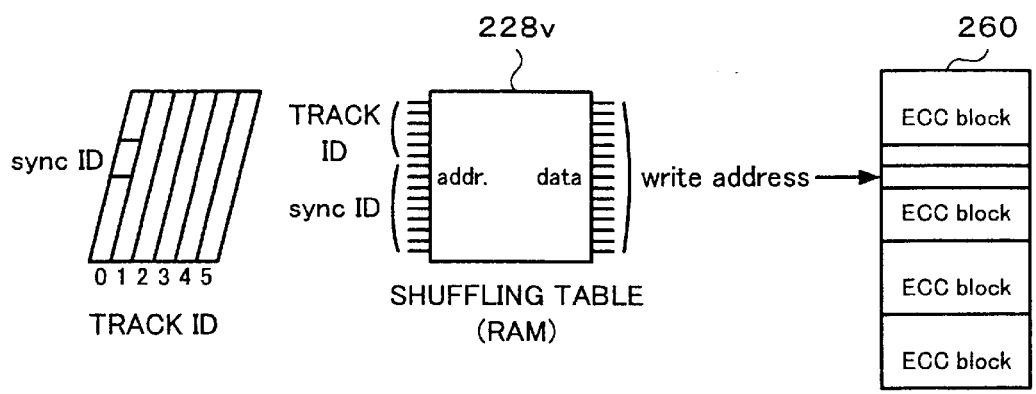
FIG. 21 is a block diagram showing a construction in the case where the shuffling unit of the system for controlling the write address in the memory is applied to a digital VTR.

As shown in FIG. 21, in an example in which a track ID and a sync ID are included in the data and the position of the sync block in, for example, 8 tracks of one frame is unconditionally determined, the track ID and sync ID are supplied as addresses to the shuffling table 228v. The write address in the memory 260 is generated from the shuffling table 228v. The sync block is written into the memory 260 in response to the write address. The memory 260 has an area for storing the data of, for example, each of 4 ECC blocks of one track. Therefore, the video data of one track is distributed and stored into the area corresponding to each of the 4 ECC blocks on a sync block unit basis.

Figure 22:
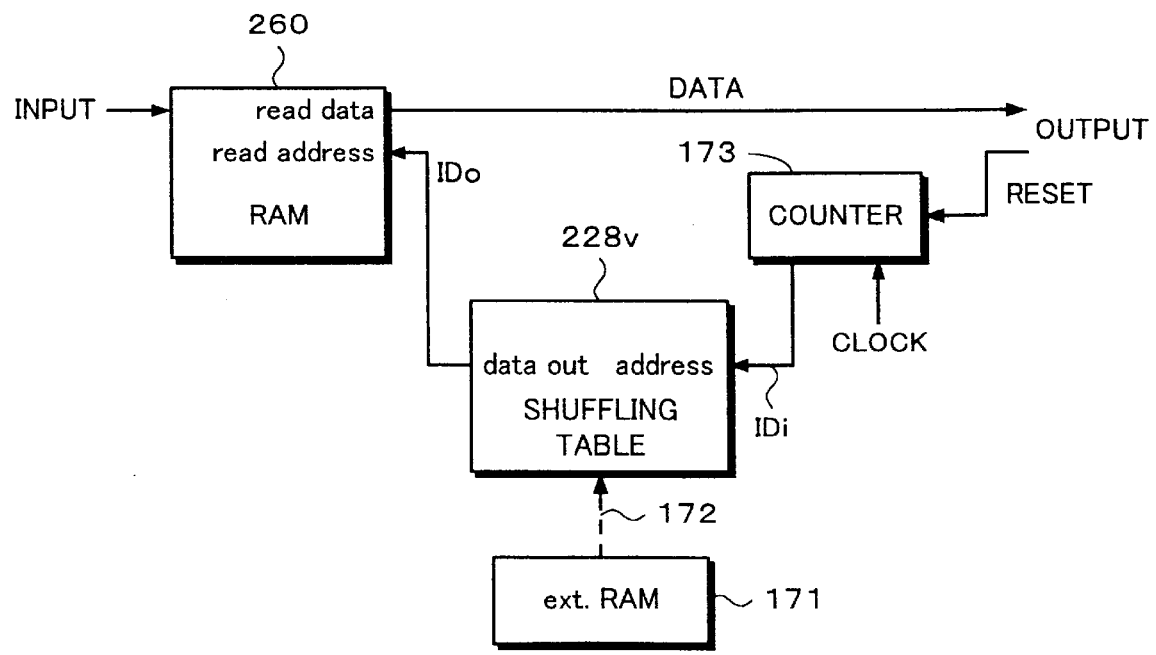
FIG. 22 is a block diagram showing a construction of a shuffling unit of a system for controlling a read address in a memory.

FIG. 22 shows an example of shuffling by controlling the read address in the memory 260. The shuffling table data is stored from the external memory 171 into the shuffling table 228v and its output IDo is supplied as a read address to the memory 260. The input IDi for the shuffling table 228v is generated from a counter 173. The counter 173 generates IDi which is reset at a timing synchronized with the data read out from the memory 260 and increased by "1" in response to a clock. For example, IDi is used as a sync ID. Data is outputted from the memory 260 in response to the read address (IDo) converted in the shuffling table 228v.

Figure 23:
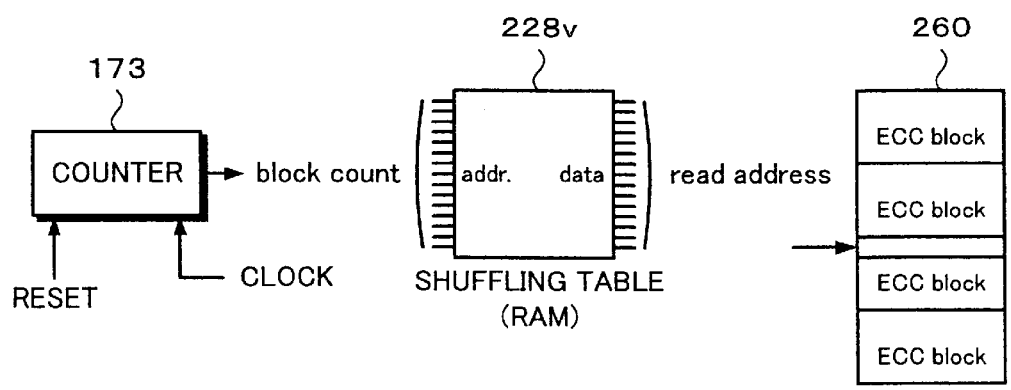
FIG. 23 is a block diagram showing a construction in the case where the shuffling unit of the system for controlling the read address in the memory is applied to a digital VTR.

FIG. 23 is a diagram for schematically explaining the shuffling to control the read address. The counter 173 is reset by a reset signal which is generated every data to which the ID of the serial number is allocated by the output of the memory 260. A count value of the counter 173 is counted up by the clock synchronized with the sync block. A count value (for example, sync ID) which is outputted from the counter 173 and increased by +1 every block is supplied as an address to the shuffling table 228v. An output of the shuffling table 228v is supplied as a read address to the memory 260. Therefore, the data of one sync block is read out from the read address in the memory 260. The shuffling table 128v and main memory 160 in FIG. 11 in the embodiment of the invention correspond to the shuffling table 228v and memory 260, respectively.

The invention is characterized by a shuffling pattern which is realized as a shuffling table in the digital VTR as mentioned above. In the embodiment, the packing and shuffling unit 107 and shuffling unit 110 are provided with respect to the video data. By both of them, the image position of the macroblock on the image and the recording position (specified by the sync ID) on the tape are made to correspond. In the invention, in the recording unit (for example, a plurality of macroblocks which are recorded as video sectors on the upper side or lower side of one track) constructed by a plurality of macroblocks in which the shuffling is completed, a line that is drawn in accordance with the order to which the sync ID is added is set to a Peano curve. Generally, the Peano curve is a curve to fully paint out the inside of a square by a continuous curve. In the invention, the Peano curve denotes a curve which passes through all of the macroblocks in the recording unit. By allocating the numbers of the sync IDs in order of the Peano curve, it is guaranteed that a plurality of macroblocks having the continuous sync IDs are coupled so as to form an almost rectangle in all of the portions of the recording unit.

A method of forming the shuffling pattern based on the Peano curve will now be described with reference to FIGS. 24A to 24D. First, a recording unit as a range where a curve (Peano curve) which couples the continuous sync IDs is determined. When considering that the head reproduces the data over a plurality of tracks in the high speed reproducing mode, it is desirable that the recording unit lies within a range including the macroblocks of the number that is equal to or smaller than the number of macroblocks included in one track. For example, the data which is recorded as a video sector of the upper or lower area of each track of the track pattern shown in FIG. 10 is set as a recording unit.

As for the recording unit, assuming that the number of macroblocks in the horizontal direction is equal to x and the number of macroblocks in the vertical direction is equal to y, it is preferable to set to $(x=2^n, y=2^n \cdot m)$ or $(x=2^n \cdot m, y=2^n)$ (where, n and m are natural numbers). In FIGS. 24A to 24D, the recording unit is set to (16×16) macroblocks.

Figure 24A:
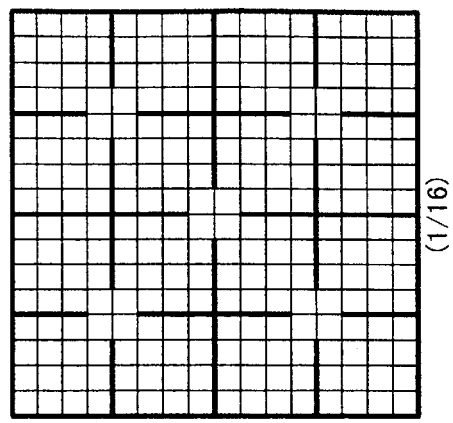
FIGS. 24A to 24D are schematic diagrams for explaining a shuffling process according to the invention.
Figure 24B:
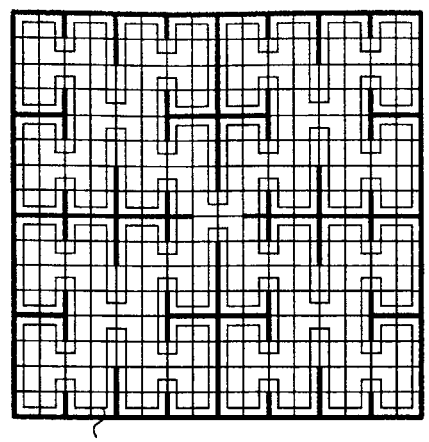
Figure 24C:
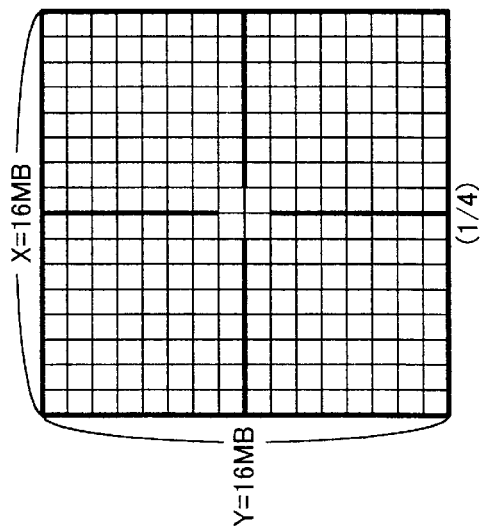

As shown in FIG. 24A, cross lines adapted to divide the recording unit into four equal parts and the line segments included in (2×2=4) macroblocks around a center cross point among the cross lines are deleted. Subsequently, as shown in FIG. 24B, the recording unit is divided into 16 parts so as to further divide each of the 4 divided range into 4 parts. Among the cross lines for further dividing into 4 parts, the line segments included in the macroblocks around the center cross point are similarly deleted. Furthermore, as shown in FIG. 24C, the recording unit is divided into 64 parts so as to further divide each of the divided ranges into 4 parts. Among the cross lines for further dividing into 4 parts, the line segments included in the macroblocks around the center cross point are similarly deleted.

In a state where the recording unit has been divided into 64 parts as shown in FIG. 24C, a Peano curve P1 which is obtained by drawing while tracing the edges of the line segments for dividing into 4 parts passes through all of the macroblocks in the recording unit. A start point when the Peano curve P1 is drawn can be arbitrarily set. However, if the size of recording unit is large, even in a result of the 64-division, the Peano curve does not pass through all of the macroblocks. In this case, the 4-dividing process is repeated in a manner similar to that mentioned above until the Peano curve passes through all of the macroblocks.

A shuffling table is formed so that the sync IDs are continuous in order of the Peano curve P1 derived as mentioned above. As will be understood from FIG. 24C, when the Peano curve P1 is drawn, there is a case where two Peano curves pass on the same macroblock. This means that the same macroblock is recorded twice as two sync blocks onto the tape. This double recording is unpreferable from a viewpoint of an increase of redundancy of the data to be recorded.

Figure 24D:
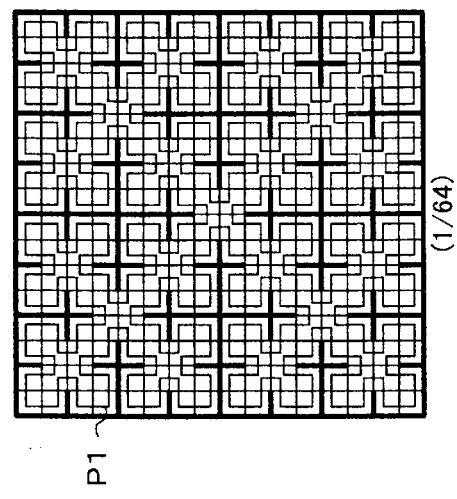

As shown in FIG. 24D, therefore, the Peano curve P1 is concealed and a final Peano curve P2 is formed so as not to cause an overlap of the curve on the same macroblock. The sync IDs are added in the ascending order according to the Peano curve P2. As a sync ID, it is sufficient to use a sync ID by which the sync block of each recording unit can be identified when the track ID and an ID adapted to distinguish the upper area (upper sector) and lower area (lower sector) of the track are used.

In the foregoing digital VTR, the packing and shuffling unit 107 and shuffling unit 110 are provided. The above shuffling process is realized as a process in which those two shuffling processes are integrated. The foregoing digital VTR can cope with a plurality of recording formats. Although the shuffling process according to the invention described with reference to FIGS. 24A to 24D is applied to, for example, the 525/60 system, it can be also similarly applied to another system of a plurality of recording formats.

The invention can be also applied to a case of recording the video data to a tape-shaped recording medium other than the magnetic tape, for example, to an optical tape which can be recorded by a laser beam.

In the invention, the Peano curve is drawn every recording unit and the sync IDs are specified in order of drawing the Peano curve. Therefore, a point that a plurality of image blocks included in the sync block specified by a plurality of sync IDs which are continuously reproduced from the tape are coupled so as to form an almost rectangle is guaranteed in all of the portions of the recording unit. Therefore, even if the tape speed in the high speed reproducing mode is changed to various speeds, a plurality of macroblocks which are intermittently reproduced from each track can be collectively reproduced so as to form a rectangle, thereby enabling a reproduced image to be easily seen in the high speed reproducing mode.

As another method of coupling the macroblocks in the recording unit, a method of drawing a zigzag curve in the recording unit is also considered. In this case, however, a plurality of macroblocks are obliquely coupled. A reproduced image of the obliquely coupled images is not easily seen as compared with the images coupled so as to form a rectangle as shown in the invention.

According to the invention, since a point that macroblocks are coupled so as to form an almost rectangle is guaranteed in all of the portions of the recording unit, even if the tape speed in the high speed reproducing mode is changed to various speeds, a degree of easiness when seeing the image is not deteriorated. Further, since the forming method of the shuffling table in the invention is geometric and does not depend on the resolution of the image, the size of macroblock, the size of recording unit, or the like, it can be applied to a plurality of different image formats. As mentioned above, there is an advantage that the shuffling process according to the invention has large generality.

The present invention is not limited to the foregoing embodiment but many modifications and variations are possible within the spirit and scope of the appended claims of the invention.

What is claimed is:

1. A data recording apparatus in which a relation between a position on a display image of image data constructing the display image and a position on a tape-shaped recording medium of the image data in case of recording said image data subjected to a predetermined process onto said tape-shaped recording medium by rotary heads is converted and the image data whose positional relation has been converted is recorded onto said tape-shaped recording medium, comprising:

image block forming means for dividing said image data on a unit basis of a predetermined number and forming a plurality of image blocks;

sync block forming means for forming a sync block as a unit of recording said image blocks onto said tape-shaped recording medium from said image blocks;

shuffling means for performing said conversion from the position on said display image of said image blocks to the position on said tape-shaped recording medium of said sync blocks every recording unit constructed by a predetermined number of said image blocks, performing said conversion in such a manner that in a whole range of said recording unit, said plurality of image blocks included in said plurality of sync blocks which are continuous on said tape-shaped recording medium form an almost rectangle and are coupled, and performing said conversion in such a manner that when curves are drawn in accordance with the order of recording positions of said sync blocks in said recording unit, said curve is drawn so as to pass through all of said image blocks in said recording unit only once; and recording means including a recording rotary head and for recording said sync block whose position has been converted by said shuffling means onto an inclined track of said tape-shaped recording medium.

2. A data recording/reproducing apparatus in which a relation between a position on a display image of image data constructing the display image and a position on a tape-shaped recording medium of the image data in case of recording said image data subjected to a predetermined process onto said tape-shaped recording medium by rotary heads is converted, the image data whose positional relation has been converted is recorded onto said tape-shaped recording medium, and the image data in which said positional relation has been converted is reproduced from said tape-shaped recording medium, comprising:

image block forming means for dividing said image data on a unit basis of a predetermined number and forming a plurality of image blocks;

sync block forming means for forming a sync block as a unit of recording said image blocks onto said tape-shaped recording medium from said image blocks;

shuffling means for performing said conversion from the position on said display image of said image blocks to the position on said tape-shaped recording medium of said sync blocks every recording unit constructed by a predetermined number of said image blocks, performing said conversion in such a manner that in a whole range of said recording unit, said plurality of image blocks included in said plurality of sync blocks which are continuous on said tape-shaped recording medium form an almost rectangle and are coupled, and performing said conversion in such a manner that when curves are drawn in accordance with the order of recording positions of said sync blocks in said recording unit, said curve is drawn so as to pass through all of said image blocks in said recording unit only once;

recording means including a recording rotary head and for recording said sync block whose position has been converted by said shuffling means onto an inclined track of said tape-shaped recording medium;

reproducing means including a reproducing rotary head and for reproducing said sync block from said tape-shaped recording medium on which said position converted sync block has been recorded;

deshuffling means for performing a conversion opposite to said position conversion which is performed by said shuffling means to the sync block reproduced by said reproducing means, thereby forming said image blocks; and image data forming means for reproducing said image data from the image blocks formed by said deshuffling means.

3. An apparatus according to claim 1, wherein said image block forming means processes said recording unit by $$x=2^n, y=2^n \cdot m$$

or $$x=2^n \cdot m, y32\ 2^n$$

where,
- x: the number of image blocks in the horizontal direction
- y: the number of image blocks in the vertical direction
- n, m: natural number.

4. An apparatus according to claim 1, wherein said conversion which is executed by said shuffling means is such a conversion that said curve showing said conversion becomes a curve which is formed by repetitively executing a line segment forming process for forming line segments such as to draw cross lines adapted to divide said recording unit into four equal parts and delete line segments among four image blocks around a cross point of said cross lines until a curve obtained by tracing edges of the formed line segments pass through all of the image blocks.

5. An apparatus according to claim 4, wherein said conversion which is executed by said shuffling means is such a conversion that said curve showing said conversion further becomes a curve which is formed by concealing said line segments so that said curve passes only once through a same image block through which said curve passes twice.

6. An apparatus according to claim 1, wherein said image block which is formed by said image block forming means is a unit of a process for compressing said image data.

7. An apparatus according to claim 1, wherein said recording unit which is processed by said shuffling means comprises a plurality of image blocks included in one track among said inclined tracks which are formed on said tape-shaped recording medium by said recording rotary heads.

8. An apparatus according to claim 1, wherein said recording unit which is processed by said shuffling means comprises a plurality of image blocks included in an upper or lower half area in one track among said inclined tracks which are formed on said tape-shaped recording medium by said recording rotary heads.

9. An apparatus according to claim 2, wherein said image data is reproduced from said tape-shaped recording medium which was run at a speed higher than that upon recording.

10. A data recording method whereby a relation between a position on a display image of image data constructing the display image and a position on a tape-shaped recording medium of the image data in case of recording said image data subjected to a predetermined process onto said tape-shaped recording medium by rotary heads is converted and the image data whose positional relation has been converted is recorded onto said tape-shaped recording medium, comprising:

an image block forming step of dividing said image data on a unit basis of a predetermined number and forming a plurality of image blocks;

a sync block forming step of forming a sync block as a unit of recording said image blocks onto said tape-shaped recording medium from said image blocks;

a shuffling step of performing said conversion from the position on said display image of said image blocks to the position on said tape-shaped recording medium of said sync blocks every recording unit constructed by a predetermined number of said image blocks, performing said conversion in such a manner that in a whole range of said recording unit, said plurality of image blocks included in said plurality of sync blocks which are continuous on said tape-shaped recording medium form an almost rectangle and are coupled, and performing said conversion in such a manner that when curves are drawn in accordance with the order of recording positions of said sync blocks in said recording unit, said curve is drawn so as to pass through all of said image blocks in said recording unit only once; and a recording step of including a recording rotary head and recording said sync block whose position has been converted in said shuffling step onto an inclined track of said tape-shaped recording medium.

11. A data recording/reproducing method whereby a relation between a position on a display image of image data constructing the display image and a position on a tape-shaped recording medium of the image data in case of recording said image data subjected to a predetermined process onto said tape-shaped recording medium by rotary heads is converted, the image data whose positional relation has been converted is recorded onto said tape-shaped recording medium, and the image data in which said positional relation has been converted is reproduced from said tape-shaped recording medium, comprising:

an image block forming step of dividing said image data on a unit basis of a predetermined number and forming a plurality of image blocks;

a sync block forming step of forming a sync block as a unit of recording said image blocks onto said tape-shaped recording medium from said image blocks;

a shuffling step of performing said conversion from the position on said display image of said image blocks to the position on said tape-shaped recording medium of said sync blocks every recording unit constructed by a predetermined number of said image blocks, performing said conversion in such a manner that in a whole range of said recording unit, said plurality of image blocks included in said plurality of sync blocks which are continuous on said tape-shaped recording medium form an almost rectangle and are coupled, and performing said conversion in such a manner that when curves are drawn in accordance with the order of recording positions of said sync blocks in said recording unit, said curve is drawn so as to pass through all of said image blocks in said recording unit only once;

a recording step of including a recording rotary head and recording said sync block whose position has been converted in said shuffling step onto an inclined track of said tape-shaped recording medium;

a reproducing step of including a reproducing rotary head and for reproducing said sync block from said tape-shaped recording medium on which said position converted sync block has been recorded;

a deshuffling step of performing a conversion opposite to said position conversion which is performed in said shuffling step to the sync block reproduced in said reproducing step, thereby forming said image blocks; and an image data forming step of reproducing said image data from the image blocks formed in said deshuffling step.

* * * * *